US012518359B2

(12) United States Patent
Hwang

(10) Patent No.: US 12,518,359 B2
(45) Date of Patent: Jan. 6, 2026

(54) SYSTEMS AND METHODS FOR RUNTIME NETWORK ADJUSTMENT

(71) Applicant: QUALCOMM Incorporated, San Diego, CA (US)

(72) Inventor: Hau Hwang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 382 days.

(21) Appl. No.: 18/182,255

(22) Filed: Mar. 10, 2023

(65) Prior Publication Data

US 2024/0303781 A1 Sep. 12, 2024

(51) Int. Cl.
| | |
|---|---|
| *G06T 5/70* | (2024.01) |
| *G06T 5/73* | (2024.01) |
| *G06T 5/92* | (2024.01) |
| *G06T 7/90* | (2017.01) |
| *H04N 23/76* | (2023.01) |
| *H04N 23/86* | (2023.01) |

(52) U.S. Cl.
CPC .......... *G06T 5/70* (2024.01); *G06T 5/73* (2024.01); *G06T 5/92* (2024.01); *G06T 7/90* (2017.01); *H04N 23/76* (2023.01); *H04N 23/86* (2023.01); *G06T 2207/10024* (2013.01); *G06T 2207/20081* (2013.01); *G06T 2207/20084* (2013.01)

(58) Field of Classification Search
CPC .... G06T 5/70; G06T 5/73; G06T 5/92; G06T 7/90; G06T 2207/10024; G06T 2207/20081; G06T 2207/20084; G06T 5/60; H04N 23/76; H04N 23/86; G06N 3/08; G06N 20/00; G06N 3/0464

USPC ......................................................... 382/156
See application file for complete search history.

(56) References Cited

U.S. PATENT DOCUMENTS

| | | | |
|---|---|---|---|
| 2018/0349759 A1* | 12/2018 | Isogawa | G06N 3/045 |
| 2020/0372682 A1* | 11/2020 | Kim | G06T 5/92 |
| 2022/0051093 A1* | 2/2022 | Skaljak | G06T 15/06 |
| 2022/0138573 A1* | 5/2022 | Serra Lleti | G06N 7/01 706/15 |
| 2022/0138910 A1* | 5/2022 | Serra Lleti | G06T 7/11 382/157 |

(Continued)

FOREIGN PATENT DOCUMENTS

CN 110163340 A 8/2019

OTHER PUBLICATIONS

International Search Report and Written Opinion—PCT/US2024/010912—ISA/EPO—Apr. 26, 2024.

*Primary Examiner* — Ali Bayat
(74) *Attorney, Agent, or Firm* — QUALCOMM Incorporated

(57) ABSTRACT

Sensor data processing systems and techniques are described. In some examples, a sensor data processing system receives sensor data (e.g., image data). The system receives a sensor data processing parameter that is associated with a sensor data processing function, such as denoising, and that is consistent across the sensor data. The system adjusts a trained machine learning model based on the sensor data processing parameter to generate an adjusted machine learning model. The system processes the sensor data using the adjusted machine learning model to apply the sensor data processing function to the sensor data according to the sensor data processing parameter and to generate processed sensor data (e.g., denoised image data).

28 Claims, 9 Drawing Sheets

(56) References Cited

U.S. PATENT DOCUMENTS

| | | | |
|---|---|---|---|
| 2022/0408012 A1 | 12/2022 | Hwang et al. | |
| 2023/0162344 A1* | 5/2023 | Zhao | G06V 10/82 382/141 |
| 2023/0252336 A1* | 8/2023 | Mele | G06N 20/00 706/12 |

* cited by examiner

SYSTEMS AND METHODS FOR RUNTIME NETWORK ADJUSTMENT

FIELD

This application is related to image capture and processing. More specifically, this application relates to systems and methods of adjusting a machine learning model based on sensor data processing parameters to so that the adjusted machine learning model can process sensor data without needing to input the sensor data processing parameters into the machine learning model.

BACKGROUND

Many devices include one or more cameras. For example, a smartphone or tablet includes a front facing camera to capture selfie images and a rear facing camera to capture an image of a scene (such as a landscape or other scenes of interest to a device user). A camera can capture images using an image sensor of the camera, which can include an array of photodetectors. Some devices can analyze image data captured by an image sensor to detect an object within the image data. Sometimes, cameras can be used to capture images of scenes that include one or more people.

BRIEF SUMMARY

Sensor data processing systems and techniques are described. In some examples, a sensor data processing system receives sensor data (e.g., image data). The system receives a sensor data processing parameter (e.g., noise level of the image data and/or denoising amount for denoising the image data) that is associated with a sensor data processing function, such as denoising, and that is consistent across the sensor data. The sensor data processing parameter is associated with a sensor data processing function, such as denoising. The system adjusts a trained machine learning model based on the sensor data processing parameter to generate an adjusted machine learning model. The system processes the sensor data using the adjusted machine learning model to apply the sensor data processing function to the sensor data according to the sensor data processing parameter and to generate processed sensor data (e.g., denoised image data).

In another example, an apparatus for sensor data processing is provided that includes at least one memory and at least one processor coupled to the at least one memory. The at least one processor is configured to: receive sensor data; receive a sensor data processing parameter associated with a sensor data processing function, wherein the sensor data processing parameter is consistent across the sensor data; adjust a trained machine learning model based on the sensor data processing parameter to generate an adjusted machine learning model; and process, based on applying the sensor data processing function to the sensor data according to the sensor data processing parameter using the adjusted machine learning model, the sensor data to generate processed sensor data.

According to at least one example, a method is provided for sensor data processing. The method includes: receiving sensor data; receiving a sensor data processing parameter associated with a sensor data processing function, wherein the sensor data processing parameter is consistent across the sensor data; adjusting a trained machine learning model based on the sensor data processing parameter to generate an adjusted machine learning model; and processing, based on applying the sensor data processing function to the sensor data according to the sensor data processing parameter using the adjusted machine learning model, the sensor data to generate processed sensor data.

In another example, a non-transitory computer-readable medium is provided that has stored thereon instructions that, when executed by one or more processors, cause the one or more processors to: receive sensor data; receive a sensor data processing parameter associated with a sensor data processing function, wherein the sensor data processing parameter is consistent across the sensor data; adjust a trained machine learning model based on the sensor data processing parameter to generate an adjusted machine learning model; and process, based on applying the sensor data processing function to the sensor data according to the sensor data processing parameter using the adjusted machine learning model, the sensor data to generate processed sensor data.

In another example, an apparatus for sensor data processing is provided. The apparatus includes: means for receiving sensor data; means for receiving a sensor data processing parameter associated with a sensor data processing function, wherein the sensor data processing parameter is consistent across the sensor data; means for adjusting a trained machine learning model based on the sensor data processing parameter to generate an adjusted machine learning model; and means for processing, based on applying the sensor data processing function to the sensor data according to the sensor data processing parameter using the adjusted machine learning model, the sensor data to generate processed sensor data.

In some aspects, applying the sensor data processing function to the sensor data according to the sensor data processing parameter using the adjusted machine learning model includes inputting the sensor data into the adjusted machine learning model without inputting the sensor data processing parameter into the adjusted machine learning model.

In some aspects, adjusting the trained machine learning model based on the sensor data processing parameter to generate the adjusted machine learning model includes adjusting a bias offset for at least one layer of the trained machine learning model based on the sensor data processing parameter. In some aspects, adjusting the trained machine learning model based on the sensor data processing parameter to generate the adjusted machine learning model includes removing at least one weight associated with the sensor data processing parameter from the trained machine learning model. In some aspects, adjusting the trained machine learning model based on the sensor data processing parameter to generate the adjusted machine learning model includes adjusting the trained machine learning model based on the sensor data processing parameter without retraining the trained machine learning model.

In some aspects, one or more of the methods, apparatuses, and computer-readable medium described above further comprise: receiving a second sensor data processing parameter that is consistent across the sensor data; adjusting the trained machine learning model based on the sensor data processing parameter and the second sensor data processing parameter to generate the adjusted machine learning model; and processing the sensor data using the adjusted machine learning model to apply the sensor data processing function to the sensor data according to the sensor data processing parameter and the second sensor data processing parameter and to generate processed sensor data. In some aspects, the second sensor data processing parameter is associated with the sensor data processing function. In some aspects, the second sensor data processing parameter is associated with a second sensor data processing function.

In some aspects, the sensor data includes image data. In some aspects, applying the sensor data processing function to the sensor data according to the sensor data processing parameter using the adjusted machine learning model includes inputting an input tensor into the adjusted machine learning model, wherein the input tensor includes a plurality of input tensor channels, wherein the plurality of input tensor channels include information corresponding to a plurality of color channels of the image data. In some aspects, the plurality of input tensor channels include information corresponding to the plurality of color channels of the image data without including information corresponding to the sensor data processing parameter.

In some aspects, the sensor data processing function is a denoising function, wherein the sensor data processing parameter is associated with at least one of a noise level of the image data or a denoising amount for denoising the image data, and wherein the processed sensor data includes denoised sensor data corresponding to application of the denoising function to the sensor data according to the sensor data processing parameter. In some aspects, the sensor data processing function is a sharpening function, wherein the sensor data processing parameter is associated with at least one of a sharpness level of the image data or a sharpening amount for sharpening the image data, and wherein the processed sensor data includes sharpened sensor data corresponding to application of the sharpening function to the sensor data according to the sensor data processing parameter. In some aspects, the sensor data processing function is a brightness adjustment function, wherein the sensor data processing parameter is associated with at least one of a brightness level of the image data or a brightness adjustment amount for adjusting brightness in the image data, and wherein the processed sensor data includes brightness-adjusted sensor data corresponding to application of the brightness adjustment function to the sensor data according to the sensor data processing parameter. In some aspects, the sensor data processing function is a saturation adjustment function, wherein the sensor data processing parameter is associated with at least one of a saturation level of the image data or a saturation adjustment amount for adjusting saturation in the image data, and wherein the processed sensor data includes saturation-adjusted sensor data corresponding to application of the saturation adjustment function to the sensor data according to the sensor data processing parameter. In some aspects, the sensor data processing function is a tone mapping function, wherein the sensor data processing parameter is associated with at least one of a set of tones of the image data or a tone mapping for adjusting tone in the image data, and wherein the processed sensor data includes tone-adjusted sensor data corresponding to application of the tone mapping function to the sensor data according to the sensor data processing parameter.

In some aspects, the sensor data includes video data, and wherein the processed sensor data includes processed video data. In some aspects, the sensor data includes audio data, and wherein the processed sensor data includes processed audio data. In some aspects, the sensor data includes depth data, and wherein the processed sensor data includes processed depth data.

In some aspects, the trained machine learning model is a convolutional neural network (CNN), and wherein the adjusted machine learning model is an adjusted CNN with at least one change to at least one layer of the CNN.

In some aspects, one or more of the methods, apparatuses, and computer-readable medium described above further comprise: outputting the processed sensor data. In some aspects, one or more of the methods, apparatuses, and computer-readable medium described above further comprise: causing display of the processed sensor data using a display. In some aspects, one or more of the methods, apparatuses, and computer-readable medium described above further comprise: causing the processed sensor data to be sent to a recipient device using a communication transceiver.

In some aspects, the apparatus is part of, and/or includes a wearable device, an extended reality device (e.g., a virtual reality (VR) device, an augmented reality (AR) device, or a mixed reality (MR) device), a head-mounted display (HMD) device, a wireless communication device, a mobile device (e.g., a mobile telephone and/or mobile handset and/or so-called "smart phone" or other mobile device), a camera, a personal computer, a laptop computer, a server computer, a vehicle or a computing device or component of a vehicle, another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyrometers, one or more accelerometers, any combination thereof, and/or other sensor).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following drawing figures.

DETAILED DESCRIPTION

Figure 1:
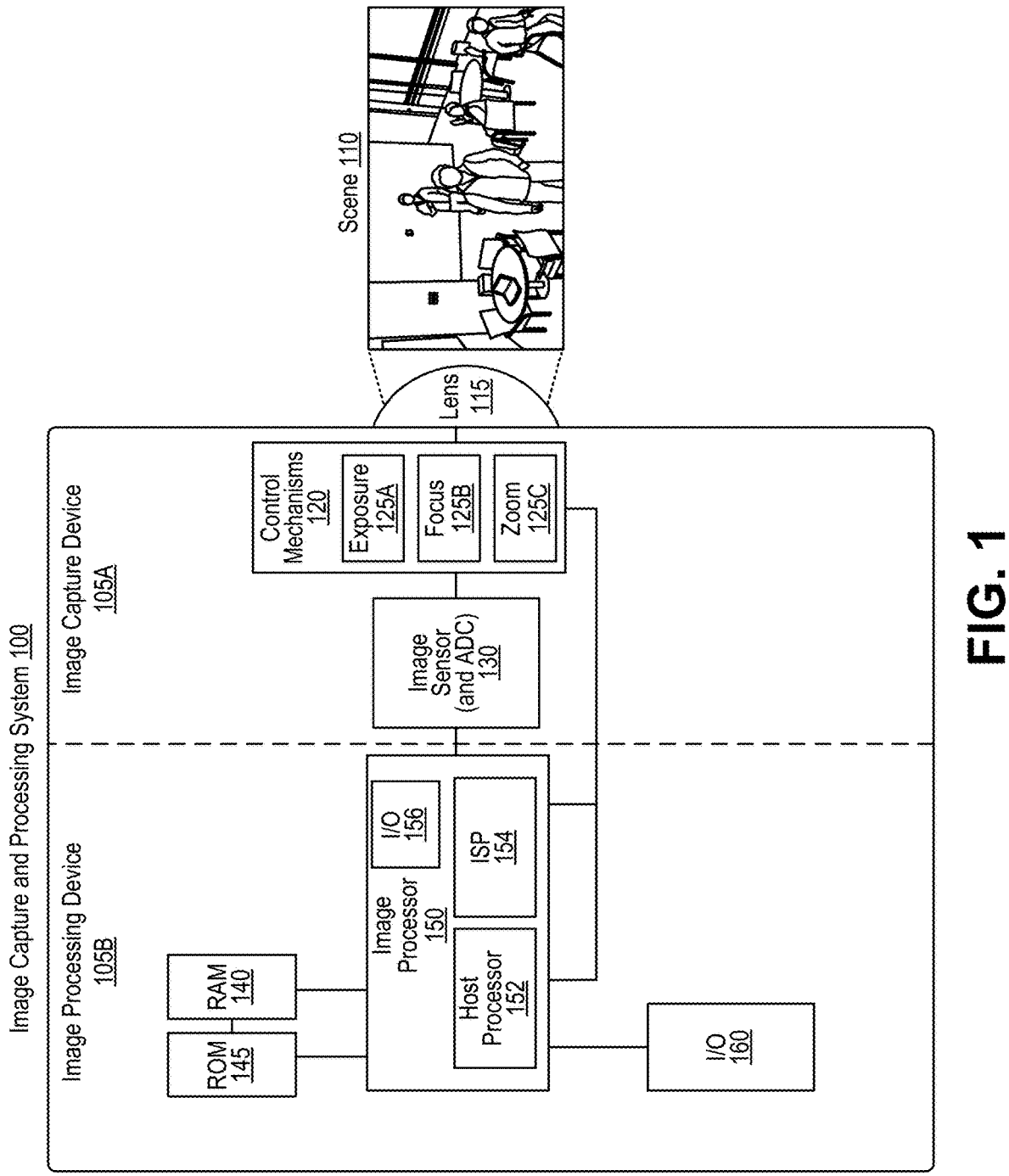
FIG. 1 is a block diagram illustrating an example architecture of an image capture and processing system, in accordance with some examples.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

A camera is a device that receives light and captures image frames, such as still images or video frames, using an image sensor. The terms "image," "image frame," and "frame" are used interchangeably herein. Cameras can be configured with a variety of image capture and image processing settings. The different settings result in images with different appearances. Some camera settings are determined and applied before or during capture of one or more image frames, such as ISO, exposure time, aperture size, f/stop, shutter speed, focus, and gain. For example, settings or parameters can be applied to an image sensor for capturing the one or more image frames. Other camera settings can configure post-processing of one or more image frames, such as alterations to contrast, brightness, saturation, sharpness, levels, curves, or colors. For example, settings or parameters can be applied to a processor (e.g., an image signal processor or ISP) for processing the one or more image frames captured by the image sensor.

A device that includes a camera can analyze image data captured by an image sensor to detect, recognize, classify, and/or track an object within the image data. For instance, by detecting and/or recognizing an object in multiple video frames of a video, the device can track movement of the object over time.

In neural network (NN) architectures and other machine learning (ML) architectures, data samples are passed to a ML model for processing, generally with various parameters (e.g., noise level, denoising amount) added as additional inputs to the ML model. During training an NN, the parameters can be concatenated to the data samples at portion(s) of the NN (e.g., the beginning of the NN) to process the data samples according to the parameters. The parameters allow the NN to differentiate across the various data samples the NN is learning from. The learning and/or processing processes for the NN involve extra computation as the additional parameters provide extra channels or dimensions of data that go through all of the NN's calculations. In some cases, however, one or more of the parameters (e.g., noise level, denoising amount) are consistent, constant, and/or static across data in the data sample (e.g., across the pixels of an image). In some examples, systems and techniques are described for adjusting the NN (or another ML model) based on the parameters, for instance so that bias offsets in one or more layers of the NN are set based on values of the parameters and/or so that weights corresponding to the parameters are removed from one or more layers of the NN. The result is an adjusted NN that can process the data sample according to the parameters using only the data sample as an input, without receiving the parameters as an input. Using the adjusted NN in place of the NN and the reduced input (that includes the data sample without the parameters) reduces the number of channels and/or dimensions of data that are input to and processed by the (adjusted) NN, can therefore reduce processing time for processing the data sample according to the parameters, can therefore reduce computational resources used in processing the data sample according to the parameters, and can therefore improve speed and efficiency in processing the data sample according to the parameters.

In some examples, systems and techniques are described for sensor data processing systems. In some examples, a sensor data processing system receives sensor data (e.g., image data). The system receives a sensor data processing parameter (e.g., noise level of the image data and/or denoising amount for denoising the image data) that is associated with a sensor data processing function, such as denoising, and that is consistent across the sensor data. The system adjusts a trained machine learning model based on the sensor data processing parameter to generate an adjusted machine learning model. The system processes the sensor data using the adjusted machine learning model to apply the sensor data processing function to the sensor data according to the sensor data processing parameter and to generate processed sensor data (e.g., denoised image data).

The imaging systems and techniques described herein provide a number of technical improvements over prior imaging systems, for instance processing images so that hues, tones, and or other characteristics of representations of certain types objects (e.g., skin, faces, hands, vegetation, sky, water, or other object types) are more accurate and true to their real-world appearances, more precise, and more consistent. The imaging systems and techniques described herein can also provide a useful input for calibrating image sensors and/or other sensors.

Various aspects of the application will be described with respect to the figures. FIG. 1 is a block diagram illustrating an architecture of an image capture and processing system 100. The image capture and processing system 100 includes various components that are used to capture and process images of one or more scenes (e.g., an image of a scene 110). The image capture and processing system 100 can capture standalone images (or photographs) and/or can capture videos that include multiple images (or video frames) in a particular sequence. A lens 115 of the system 100 faces a scene 110 and receives light from the scene 110. The lens 115 bends the light toward the image sensor 130. The light received by the lens 115 passes through an aperture controlled by one or more control mechanisms 120 and is received by an image sensor 130. In some examples, the scene 110 is a scene in an environment. In some examples, the scene 110 is a scene of at least a portion of a user. For instance, the scene 110 can be a scene of one or both of the user's eyes, and/or at least a portion of the user's face.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo, thereby adjusting focus. In some cases, additional lenses may be included in the system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), or some combination thereof. The focus setting may be determined using the control mechanism 120, the image sensor 130, and/or the image processor 150. The focus setting may be referred to as an image capture setting and/or an image processing setting.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference) with a negative (e.g., diverging, concave) lens between them. In some cases, the zoom control mechanism 125C moves one or more of the lenses in the afocal zoom system, such as the negative lens and one or both of the positive lenses.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 130 may alternately or additionally include opaque and/or reflective masks that block light from reaching certain photodiodes, or portions of certain photodiodes, at certain times and/or from certain angles, which may be used for phase detection autofocus (PDAF). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 150 may include one or more processors, such as one or more image signal processors (ISPs) (including ISP 154), one or more host processors (including host processor 152), and/or one or more of any other type of processor 910 discussed with respect to the computing system 900. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140 and/or 920, read-only memory (ROM) 145 and/or 925, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 935, any other input devices 945, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the system 100 and one or more peripheral devices, over which the system 100 may receive data from the one or more peripheral device and/or transmit data to the one or more peripheral devices. The I/O 160 may include one or more wireless transceivers that enable a wireless connection between the system 100 and one or more peripheral devices, over which the system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 902.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

Figure 2:
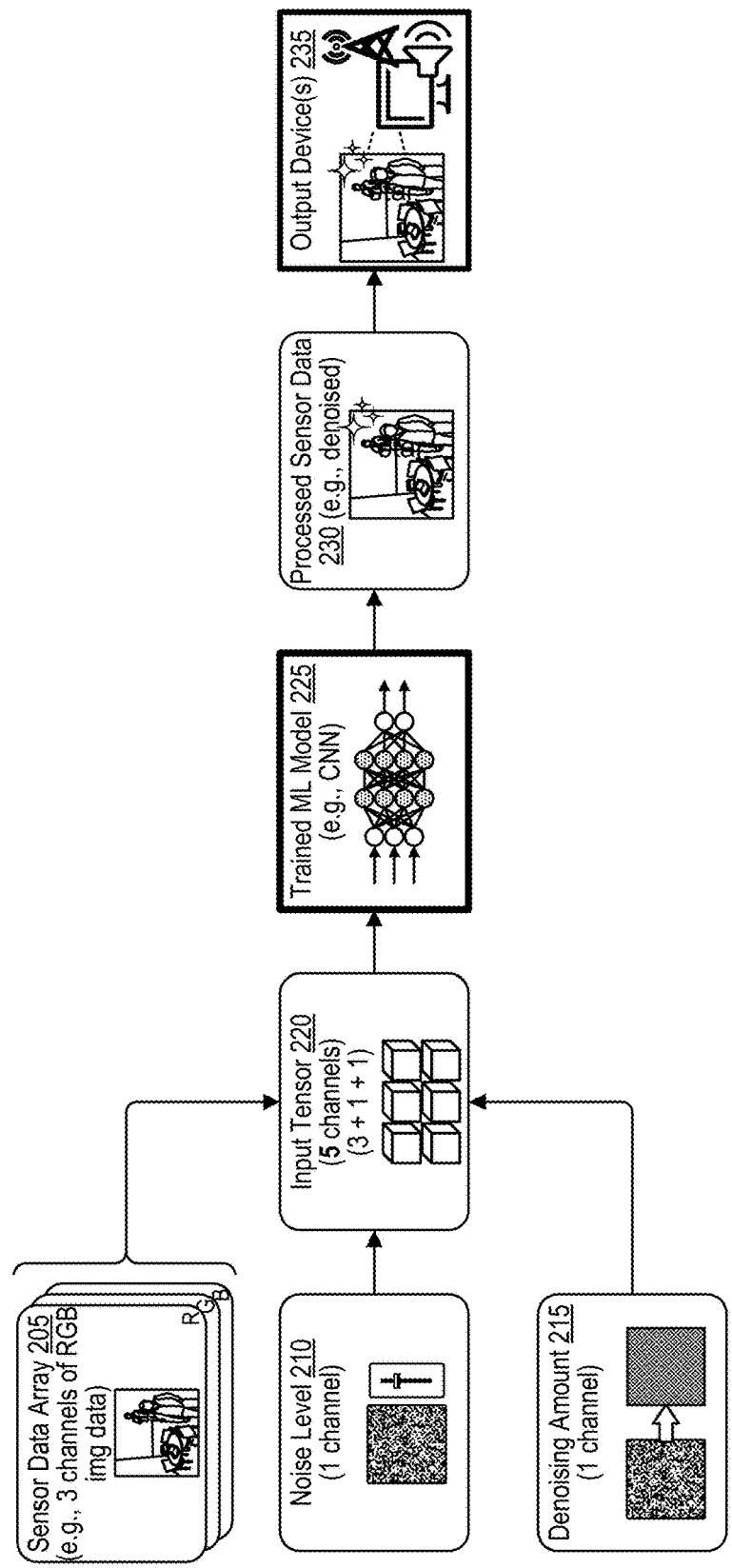
FIG. 2 is a block diagram illustrating an example architecture of a sensor data processing system that inputs an input tensor with 5 channels into a trained machine learning model to generate processed sensor data, in accordance with some examples.

FIG. 2 is a block diagram illustrating an example architecture of a sensor data processing system 200 that inputs an input tensor 220 with 5 channels into a trained machine learning model 225 to generate processed sensor data 230. The sensor data processing system 200 can include at least one of the image capture and processing system 100, the image capture device 105A, the image processing device 105B, portion(s) of the sensor data processing system 300, the neural network (NN) 400, the node 505, the HMD 610, the mobile handset 710, a sensor data processing system that performs the process 800, the computing system 900, the processor 910, or a combination thereof. In some examples, the sensor data processing system 200 can include, for instance, one or more laptops, phones, tablet computers, mobile handsets, video game consoles, vehicle computers, desktop computers, wearable devices, televisions, media centers, extended reality (XR) systems, virtual reality (VR) systems, augmented reality (AR) systems, mixed reality (MR) systems, head-mounted display (HMD) devices, other types of computing devices discussed herein, or combinations thereof.

The sensor data processing system 200 receives a sensor data array 205 that includes sensor data. The sensor data in the sensor data array 205 can be captured by at least one sensor, such as the image sensor 130, a sensor used to capture sensor data used as input data for the input layer 410 of the NN 400, the first camera 630A, the second camera 630B, the third camera 630C, the fourth camera 630D, the first camera 730A, the second camera 730B, the third camera 730C, the fourth camera 730D, a sensor used to capture the sensor data of operation 805, the input device 945, another sensor described herein, or a combination thereof. In some examples, the sensor data array 205 includes image data or video data, for instance where the sensor includes an image sensor. In FIG. 2, a graphic is illustrated representing the sensor data array 205 as three arrays of color image data corresponding to three arrays of pixel data in different color channels, such as red (R), green (G), and blue (B).

The sensor data array 205 can represent part of an input tensor 220 to be input into a trained machine learning (ML) model 225. Different channels or dimensions of the sensor data array 205 can be represented in the input tensor 220 as different channels or dimensions of the input tensor 220. For instance, a color image with three color channels (e.g., red, green, and blue) in the sensor data array 205 can be represented in three channels or dimensions of the input tensor 220, with each of the three channels or dimensions of the input tensor 220 corresponding to a different color channel of the image. Where the sensor data array 205 that includes a black and white or greyscale image with three color channels (e.g., red, green, and blue) can be represented in three channels or dimensions of the input tensor 220, each corresponding to a different color channel.

In some examples, the sensor data array 205 can include audio data, depth data, location data, orientation data, pose data, and/or any other type of sensor data instead of or in addition to the image data and/or video data discussed above. For instance, audio in the sensor data array 205 can represent at least one channel in the input tensor 220. Different video frames in the sensor data array 205 can each represent at least one channel in the input tensor 220 (e.g., making time a channel or dimension in the input tensor 220). Sensor types can include, for instance, image sensors, cameras, microphones, heart rate monitors, oximeters, biometric sensors, positioning receivers, Global Navigation Satellite System (GNSS) receivers, Inertial Measurement Units (IMUs), accelerometers, gyroscopes, gyrometers, barometers, thermometers, altimeters, depth sensors, light detection and ranging (LIDAR) sensors, radio detection and ranging (RADAR) sensors, sound detection and ranging (SODAR) sensors, sound navigation and ranging (SONAR) sensors, time of flight (ToF) sensors, structured light sensors, other sensors discussed herein, or combinations thereof.

It should be understood that the term sensor data array 205 is intended to be exemplary rather than limiting. For instance, the data in the sensor data array 205 can be generated (e.g., virtual content) or can be retrieved from a repository (e.g., downloaded from the Internet and/or retrieved from a database or other data structure) rather than captured by a sensor. In some examples, the data in the sensor data array 205 can be a combination of sensor-captured data and virtual data, such as content to be displayed by a device used for augmented reality (AR), mixed reality (MR), virtual reality (VR), and/or extended reality (XR).

The sensor data processing system 200 can generate, receive, and/or provide additional inputs as channels or dimensions in the input tensor. These additional inputs can include sensor data processing parameter(s) for sensor data processing function(s) for processing the sensor data in the sensor data array 205. Examples of such sensor data processing parameter(s) include a noise level 210 of the sensor data in the sensor data array 205 and a denoising amount 215 for denoising the sensor data in the sensor data array 205. In some examples, the noise level 210 can be determined based on sensor capture settings (e.g., image capture settings) used to capture the sensor data of the sensor data array 205. For instance, the noise level 210 can be based on exposure level(s), analog gain level(s), and/or digital gain level(s) used to capture image(s) of the sensor data array 205. In some examples, the noise level 210 can be determined through an analysis of the sensor data array 205, for instance by measuring a standard deviation of a luma histogram of continuous regions of the image. The denoising amount 215 can, in some examples, be based on the noise level 210, a desired smoothness level of an image (or other sensor data) of the sensor data array 205, or a combination thereof. In some examples, the denoising amount 215 can be determined using a denoising engine of the ISP 154 through analysis of an image of the sensor data array 205 and/or image capture settings used to capture the image and/or the noise level 210 of the image. Sensor data processing parameters can be associated with a particular sensor data processing function. For instance, the noise level 210 and the denoising amount 215 are associated with a denoising function for denoising the sensor data (e.g., denoising an image) in the sensor data array 205. A graphic representing the noise level 210 sensor data processing parameter in FIG. 2 illustrates an example of noise in an image, with a slider indicating a level of the noise in image data (or other sensor data) in the sensor data array 205. A graphic representing the denoising amount 215 sensor data processing parameter in FIG. 2 illustrates an example of uneven black-and-white noise in an image being converted into a smooth black-and-white pattern, as would be performed using a denoising function.

A second example of possible sensor data processing parameter(s) include a sharpness level of the sensor data (e.g., of an image) and/or a sharpening amount for sharpening the sensor data (e.g., sharpening the image), associated with a sharpening function for sharpening the sensor data (e.g., sharpening the image). A third example of possible sensor data processing parameter(s) include a brightness (or luminosity) level of the sensor data (e.g., of an image) and/or a brightness (or luminosity) adjustment (e.g., increase or decrease) amount for adjusting a brightness (or luminosity) of the sensor data (e.g., adjusting brightness of the image), associated with a brightness adjustment function for adjusting the brightness of the sensor data (e.g., adjusting brightness of the image). A fourth example of possible sensor data processing parameter(s) include a saturation level of the sensor data (e.g., of an image) and/or a saturation adjustment (e.g., increase or decrease) amount for adjusting a saturation of the sensor data (e.g., adjusting saturation of the image), associated with a saturation adjustment function for adjusting the saturation of the sensor data (e.g., adjusting saturation of the image). A fifth example of possible sensor data processing parameter(s) include a set of tones of the sensor data (e.g., of an image) and/or a tone mapping for adjusting tones in the sensor data (e.g., adjusting tones in the image), associated with a tone mapping function for adjusting the tones of the sensor data (e.g., adjusting tones of the image). Other sensor data processing parameter(s), and corresponding functions, can include adjustments to contrast, image warmth, white balance, black balance, image blurring, image blur reduction, image filtering, depth point clustering, depth point filtering, audio filtering, audio noise reduction, other image processing functions or parameters discussed herein, and/or or sensor data processing functions or parameters discussed herein.

The input tensor 220 of FIG. 2 includes five channels or dimensions—specifically, three channels for the different color channels of the sensor data (e.g., image data) of the sensor data array 205 (e.g., red, green, and blue), one channel for the noise level 210 sensor data processing parameter, and one channel for the denoising amount 215 sensor data processing parameter. A graphic representing the input tensor 220 in FIG. 2 illustrates a two dimensional array of three-dimensional cubes, which is used as a conceptual representation of five dimensions or channels of data (e.g., three color channels and two sensor data processing parameters).

The sensor data processing system 200 includes a trained machine learning (ML) model 225. The trained ML model 225 can include one or more neural network (NNs) (e.g., neural network 400), one or more convolutional neural networks (CNNs), one or more trained time delay neural networks (TDNNs), one or more deep networks, one or more autoencoders, one or more deep belief nets (DBNs), one or more recurrent neural networks (RNNs), one or more generative adversarial networks (GANs), one or more conditional generative adversarial networks (cGANs), one or more other types of neural networks, one or more trained support vector machines (SVMs), one or more trained random forests (RFs), one or more computer vision systems, one or more deep learning systems, one or more classifiers, one or more transformers, or a combination thereof. Within FIG. 2, a graphic representing the trained ML model(s) 280 illustrates a set of circles connected to another. Each of the circles can represent a node (e.g., node 416, node 418), a neuron, a perceptron, a layer, a portion thereof, or a combination thereof. The circles are arranged in columns. The leftmost column of white circles represent an input layer (e.g., input layer 410). The rightmost column of white circles represent an output layer (e.g., output layer 414). Two columns of shaded circled between the leftmost column of white circles and the rightmost column of white circles each represent hidden layers (e.g., hidden layers 412A-412N). The nodes are connected using lines that can represent weights (e.g., weight 420).

The trained ML model 225 can be trained to process the sensor data in the sensor data array 205 from the input tensor 220 to apply a sensor data processing function (e.g., denoising) to the sensor data according to the sensor data processing parameters from the input tensor 220 (e.g., the noise level 210 and the denoising amount 215) to generate processed sensor data 230. The processed sensor data 230, in this example, can include denoised sensor data that is denoised according to the noise level 210 and the denoising amount 215. A graphic representing the processed sensor data 230 in FIG. 2 illustrates the image representing the sensor data array 205 with an added sparkle graphic representing the application of the sensor data processing function (e.g., denoising). The trained ML model 225 can be trained to process sensor data to apply a sensor data processing function using training data that includes sets of sensor data and pre-processed (e.g., pre-denoised) sensor data where the sensor data processing function has been applied.

The sensor data processing system 200 includes output device(s) 235. The output device(s) 235 can include one or more visual output devices, such as display(s) or connector(s) therefor. The output device(s) 235 can include one or more audio output devices, such as speaker(s), headphone(s), and/or connector(s) therefor. The output device(s) 235 can include one or more of the output device 935 and/or of the communication interface 940 of the computing system 900. In some examples, the sensor data processing system 200 causes the display(s) of the output device(s) 235 to display the processed sensor data 230.

In some examples, the output device(s) 235 include one or more transceivers. The transceiver(s) can include wired transmitters, receivers, transceivers, or combinations thereof. The transceiver(s) can include wireless transmitters, receivers, transceivers, or combinations thereof. The transceiver(s) can include one or more of the output device 935 and/or of the communication interface 940 of the computing system 900. In some examples, the sensor data processing system 200 causes the transceiver(s) to send, to a recipient device, the processed sensor data 230. In some examples, the recipient device can include another sensor data processing system 200, a sensor data processing system 300, an HMD 610, a mobile handset 710, a computing system 900, or a combination thereof. In some examples, the recipient device can include a display, and the data sent to the recipient device from the transceiver(s) of the output device(s) 235 can cause the display of the recipient device to display the processed sensor data 230.

In some examples, the display(s) of the output device(s) 235 of the sensor data processing system 200 function as optical "see-through" display(s) that allow light from the real-world environment (scene) around the sensor data processing system 200 to traverse (e.g., pass) through the display(s) of the output device(s) 235 to reach one or both eyes of the user. For example, the display(s) of the output device(s) 235 can be at least partially transparent, translucent, light-permissive, light-transmissive, or a combination thereof. In an illustrative example, the display(s) of the output device(s) 235 includes a transparent, translucent, and/or light-transmissive lens and a projector. The display(s) of the output device(s) 235 of can include a projector that projects virtual content (e.g., the processed sensor data 230) onto the lens. The lens may be, for example, a lens of a pair of glasses, a lens of a goggle, a contact lens, a lens of a head-mounted display (HMD) device, or a combination thereof. Light from the real-world environment passes through the lens and reaches one or both eyes of the user. The projector can project virtual content (e.g., the processed sensor data 230) onto the lens, causing the virtual content to appear to be overlaid over the user's view of the environment from the perspective of one or both of the user's eyes. In some examples, the projector can project the virtual content onto the onto one or both retinas of one or both eyes of the user rather than onto a lens, which may be referred to as a virtual retinal display (VRD), a retinal scan display (RSD), or a retinal projector (RP) display.

In some examples, the display(s) of the output device(s) 235 of the sensor data processing system 200 are digital "pass-through" display that allow the user of the sensor data processing system 200 and/or a recipient device to see a view of an environment by displaying the view of the environment on the display(s) of the output device(s) 235. The view of the environment that is displayed on the digital pass-through display can be a view of the real-world environment around the sensor data processing system 200, for example based on sensor data (e.g., images, videos, depth images, point clouds, other depth data, or combinations thereof) captured by the sensor (e.g., sensor data array 205) and/or other sensors described herein. The view of the environment that is displayed on the digital pass-through display can be a virtual environment (e.g., as in VR), which may in some cases include elements that are based on the real-world environment (e.g., boundaries of a room). The view of the environment that is displayed on the digital pass-through display can be an augmented environment (e.g., as in AR) that is based on the real-world environment. The view of the environment that is displayed on the digital pass-through display can be a mixed environment (e.g., as in MR) that is based on the real-world environment. The view of the environment that is displayed on the digital pass-through display can include virtual content (e.g., processed sensor data 230) overlaid over other otherwise incorporated into the view of the environment.

Within FIG. 2, a graphic representing the output device(s) 235 illustrates a display, a speaker, and a wireless transceiver, outputting the graphic representing the processed sensor data 230.

In some examples, certain sensor data processing parameters can be consistent (e.g., constant and/or static) across data in the sensor data array 205 (e.g., across pixels in an image of the sensor data array 205). For instance, where the sensor data array 205 represents an image, the noise level 210 can be consistent across the entire image, and the denoising amount 215 to be applied for denoising the image can be consistent across the entire image. In some examples, the sensor data processing parameters can be consistent (e.g., constant and/or static) across a portion of the image (e.g., a block of the image as used in image or video encoding, compression, decoding, and/or decompression). In some examples, the sensor data processing parameters can be consistent (e.g., constant and/or static) across one or more video frames of a video. In some examples, the sensor data processing parameters can be consistent (e.g., constant and/or static) across an entirety of an audio sample. In some examples, the sensor data processing parameters can be consistent (e.g., constant and/or static) across an entirety of a specified range of frequencies in an audio sample. In some examples, the sensor data processing parameters can be consistent (e.g., constant and/or static) across an entirety of depth data in a depth data sample (e.g., a point cloud, a 3D model, and/or a depth image).

Figure 3:
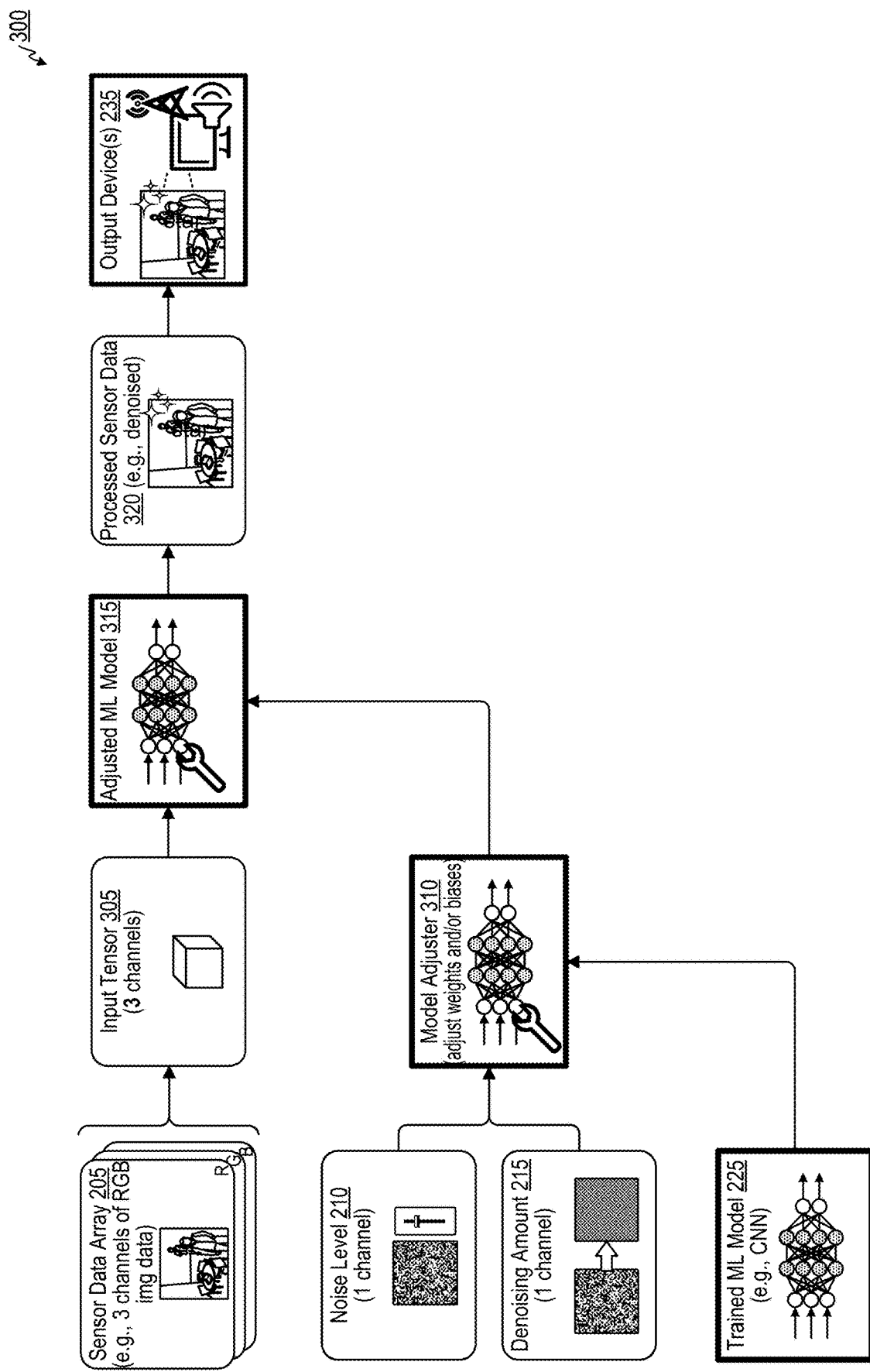
FIG. 3 is a block diagram illustrating an example architecture of a sensor data processing system that inputs an input tensor with 3 channels into an adjusted machine learning model to generate processed sensor data, in accordance with some examples.

FIG. 3 is a block diagram illustrating an example architecture of a sensor data processing system 300 that inputs an input tensor 305 with 3 channels into an adjusted machine learning model 315 to generate processed sensor data 320. Similarly to the sensor data processing system 200, the sensor data processing system 300 receives the sensor data array 205 and incorporates the channels (e.g., color channels) of the sensor data array 205 into an input tensor 305.

Rather than incorporate the sensor data processing parameters (e.g., noise level 210 and denoising amount 215) into the input tensor 305 as in the input tensor 220 of FIG. 2, the sensor data processing system 300 instead uses a model adjuster 310 to adjust the trained ML model 225 based on the sensor data processing parameters (e.g., noise level 210 and denoising amount 215) to generate an adjusted ML model 315. The model adjuster 310 can adjust the trained ML model 225 to generate the adjusted ML model 315 by setting, or adjusting (e.g., incrementing, decrementing, or offsetting), bias offsets in one or more layers of the trained ML model 225 (e.g., in one or more layers of the NN 400) based on values of the sensor data processing parameters (e.g., noise level 210 and denoising amount 215). The model adjuster 310 can also adjust the trained ML model 225 to generate the adjusted ML model 315 by removing nodes (neurons), interconnections (synapses), and/or weights from the trained ML model 225 that exclusively concerned the sensor data processing parameters (e.g., noise level 210 and denoising amount 215). In some examples, the model adjuster 310 can adjust the trained ML model 225 to generate the adjusted ML model 315 without retraining the trained ML model 225, but instead by tweaking or removing certain values (e.g., bias offsets and/or weights) in the trained ML model 225. Such adjustments are possible in situations where sensor data processing parameters are consistent (e.g., constant and/or static) across data in the sensor data array 205 as discussed above. Because the model adjuster 310 does not retrain the trained ML model 225, the model adjuster 310 can generate the adjusted ML model 315 quickly and efficiently, using few computational resources. A graphic representing the model adjuster 310 and the adjusted ML model 315 in FIG. 3 illustrates the graphic representing the trained ML model 225, with aspects (e.g., bias offsets and/or weights) of certain nodes being adjusted as represented by a wrench graphic.

Because the sensor data processing parameters (e.g., noise level 210 and denoising amount 215) are incorporated into the adjusted ML model 315 by the model adjuster 310, the input tensor 305 of FIG. 3 no longer incorporates the sensor data processing parameters (e.g., noise level 210 and denoising amount 215), unlike the input tensor 220 of FIG. 3. Thus, a graphic representing the input tensor 305 in FIG. 3 illustrates a single three-dimensional cube, which is used as a conceptual representation of three dimensions or channels of data (e.g., three color channels). The reduction in channels or dimensions of data in the input tensor 305 (compared to the input tensor 220) through removal of the sensor data processing parameter channels, and the corresponding reduction in need to process those sensor data processing parameter channels or dimensions of data by the adjusted ML model 315 (e.g., and, in some cases, removal of certain nodes (neurons), interconnections (synapses), and/or weights corresponding to those sensor data processing parameter channels or dimensions) (compared to the trained ML model 225), represents a significant reduction in processing time and computational resources for processing the sensor data of the sensor data array 205 from the input tensor 305 using the adjusted ML model 315 (compared to processing the sensor data of the sensor data array 205 and the sensor data processing parameters from the input tensor 220 using the trained ML model 225). The reduction in processing time and computational resources may depend on network structure.

In some examples, the adjusted ML model 315 and the trained ML model 225 are convolutional neural networks (CNNs). In the trained ML model 225 of FIG. 2, in a situation where the sensor data processing parameters (e.g., noise level 210 and denoising amount 215) are consistent (e.g., constant and/or static) across data in the sensor data array 205, each output result of a first convolutional layer (e.g., the input layer 410 and/or first convolutional layer of the hidden layers 412A to 412N) of the trained ML model 225 is created by applying separate P×Q filters on each of the 5 input layers, and adding a bias term. There are N sets of these filters and N bias terms to generate the N output channels. Because the sensor data processing parameters (e.g., noise level 210 and denoising amount 215) are consistent (e.g., constant and/or static) across data in the sensor data array 205, the P×Q filter result on the sensor data processing parameters channels also result in consistent (e.g., constant and/or static) values. By removing the sensor data processing parameter input channels of the input tensor 305 entirely (compared to the input tensor 220) and instead folding the sensor data processing parameters into the bias offsets of the adjusted ML model 315, the sensor data processing system 300 is more efficient than the sensor data processing system 200 for situations where the sensor data processing parameters (e.g., noise level 210 and denoising amount 215) are consistent (e.g., constant and/or static) across data in the sensor data array 205.

In terms of the example above, the model adjuster 310 can adjust the trained ML model 225 to generate the adjusted ML model 315 by adjusting weights and/or biases of at least the first convolutional layer of the trained ML model 225 (e.g., the input layer 410 and/or first convolutional layer of the hidden layers 412A to 412N). In some examples, the model adjuster 310 computes a bias offset contribution for all of the sensor data processing parameters that are consistent (e.g., constant and/or static) across data in the sensor data array 205. The model adjuster 310 adjusts the N output channel biases to include this contribution. The model adjuster 310 remove the input weights (e.g., weight 420) corresponding to the former sensor data processing parameters inputs (e.g., noise level 210 and denoising amount 215) that are no longer inputs to the adjusted ML model 315.

In the sensor data processing system 300, the sensor data of the sensor data array 205 from the input tensor 305 is processed using a sensor processing function (e.g., denoising) according to sensor data processing parameters (e.g., noise level 210 and denoising amount 215) using the adjusted ML model 315 (e.g., based on the sensor data processing parameters having been incorporated into biases and/or weights of the adjusted ML model 315) to generate the processed sensor data 320. In some examples, the processed sensor data 320 is identical to the processed sensor data 230, even though generation of the processed sensor data 320 by the sensor data processing system 300 is more efficient than generation of the processed sensor data 230 by the sensor data processing system 200. The processed sensor data 320 can be output using the output device(s) 235 of the sensor data processing system 300 as discussed above with respect to output of the processed sensor data 230 using the output device(s) 235 of the sensor data processing system 200.

In some examples, the adjustment of the trained ML model 225 by the model adjuster 310 to incorporate consistent elements into the adjusted ML model 315 can apply to other elements that are consistent, constant, or static beyond sensor data processing parameters. In some examples, the adjustment of the trained ML model 225 by the model adjuster 310 to incorporate consistent elements into the adjusted ML model 315 can apply to other parts of a ML model (e.g., of a CNN or other NN) where constant inputs are similarly to be processed by subsequent neural network layers like convolutional layers.

In some examples, the adjustment of the trained ML model 225 by the model adjuster 310 to incorporate consistent elements into the adjusted ML model 315 can also adjust weights of the network (e.g., at runtime), instead of or in addition to the biases. For instance, in an illustrative example, if the variance and mean of the input data are to be passed as inputs to the trained ML model 225 so that the trained ML model 225 understands how to normalize the inputs to have a zero mean with unit variance, the model adjuster 310 can adjust the trained ML model 225 to explicitly fold this normalization into the 1st convolution layer weights and biases in the adjusted ML model 315.

By adjusting the trained ML model 225 by the model adjuster 310 to incorporate consistent elements into the adjusted ML model 315, the adjusted ML model 315 can avoid or skip data manipulation steps where the trained ML model 225 creates constant tensors that the trained ML model 225 concatenates with data sample inputs. The adjusted ML model 315 reduces computation by precomputing the contribution(s) for these parameter inputs and applies these contribution(s) one time (e.g., by the model adjuster 310) to the weights and/or biases at runtime. This removes the need for the adjusted ML model 315 to compute with these added layers. Adjusting the trained ML model 225 by the model adjuster 310 to incorporate consistent elements into the adjusted ML model 315 can also be helpful for reducing the channel size. This can be useful on embedded devices where ML accelerators natively work best with certain channel increments. For example, in some cases, a neural network hardware accelerator (or another type of processor 910) can be most efficient with 8 channel increments. If adding additional constant channels for parameters could exceed this range, this reduction in channels can be helpful. For instance, if the sensor data array 205 already has 8 input channels, adding a constant input channel (e.g., for sensor data processing parameter(s)) would push the inputs of the resulting input tensor to 9, which would push the neural network hardware accelerator (or other type of processor 910) to be less efficient by exceeding 8 channels.

Adjusting the trained ML model 225 by the model adjuster 310 to incorporate consistent elements into the adjusted ML model 315 is useful for camera ML networks where efficiency is critical. Generally, data manipulation steps can be very costly, especially in situations where the sensor data array 205 includes large images (e.g., 50 megapixel (MP) or 200 MP images) or videos (e.g., 4 k resolution videos at 30 frames per second (fps), 60 fps, or even 120 fps).

In some examples, certain elements of the sensor data processing system 200 and/or the sensor data processing system 300 (e.g., the sensor, the trained ML model 225, the output device(s) 235, the model adjuster 310, and/or the adjusted ML model 315) include a software element, such as a set of instructions corresponding to a program, that is run on a processor such as the processor 910 of the computing system 900, the image processor 150, the host processor 152, the ISP 154, or a combination thereof. In some examples, one or more of these elements of the sensor data processing system 200 and/or the sensor data processing system 300 can include one or more hardware elements, such as a specialized processor (e.g., the processor 910 of the computing system 900, the image processor 150, the host processor 152, the ISP 154, or a combination thereof). In some examples, one or more of these elements of the sensor data processing system 200 and/or the sensor data processing system 300 can include a combination of one or more software elements and one or more hardware elements.

Figure 4:
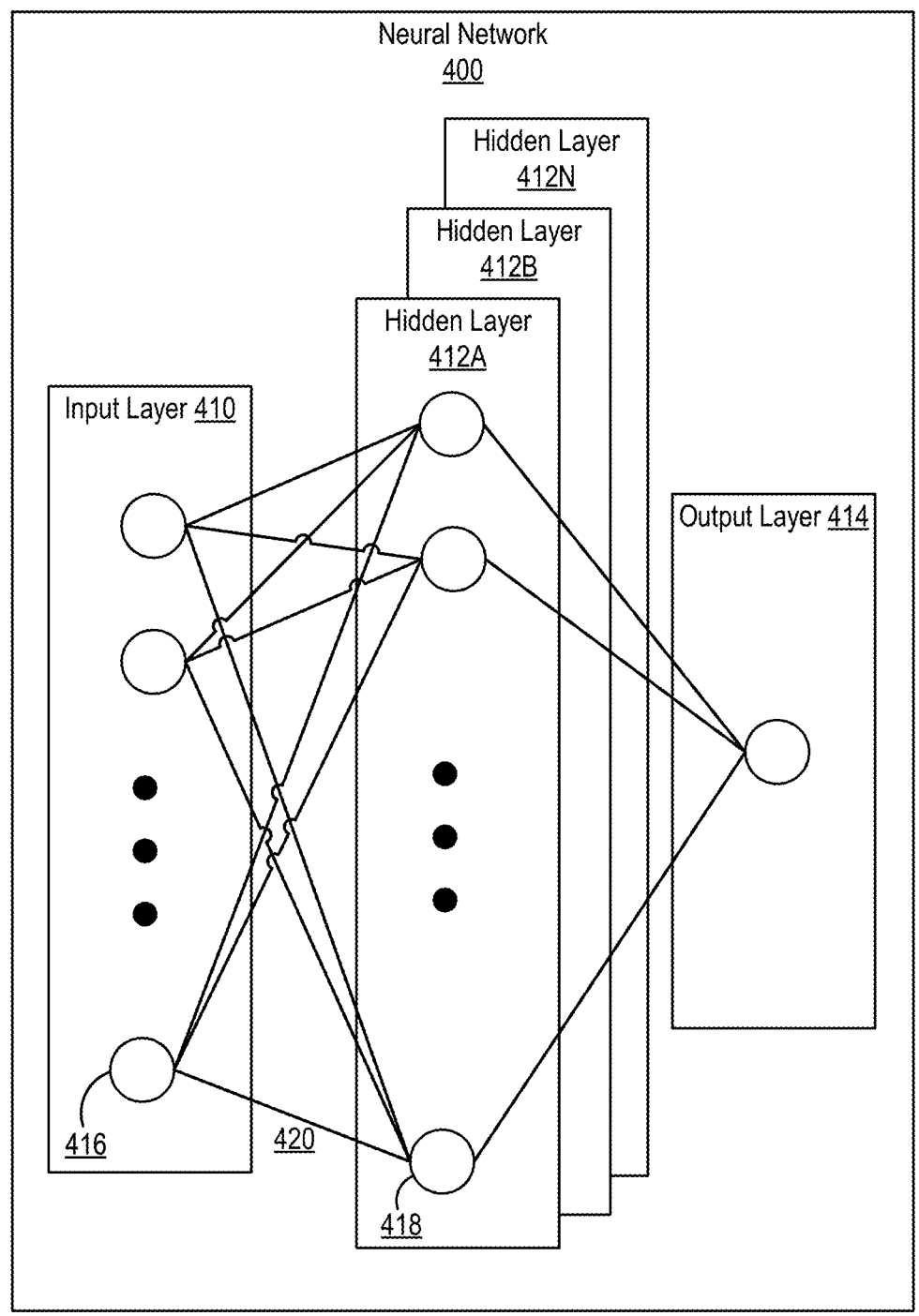
FIG. 4 is a block diagram illustrating an example of a neural network that can be used for sensor processing operations, in accordance with some examples.

FIG. 4 is a block diagram illustrating an example of a neural network (NN) 400 that can be used for imaging operations. The neural network 400 can include any type of deep network, such as a convolutional neural network (CNN), an autoencoder, a deep belief net (DBN), a Recurrent Neural Network (RNN), a Generative Adversarial Networks (GAN), and/or other type of neural network. The neural network 400 may be an example of the trained ML model 225 and/or the adjusted ML model 315. The neural network 400 may used by various subsystems of the sensor data processing system 200, the sensor data processing system 300, the HMD 610, the mobile handset 710, the sensor data processing system that performs the process 800, and/or the computing system 900, such as the model adjuster 310, the processor 910, or some combination thereof.

An input layer 410 of the neural network 400 includes input data. The input data of the input layer 410 can include data representing the pixels of one or more input image frames. In some examples, the input data of the input layer 410 includes data representing the pixels of image data. The input data of the input layer 410 can include various types of sensor data, including image data, video data, audio data, depth data, or a combination thereof. Examples of the sensor data include an image(s) captured using the image capture and processing system 100, the sensor data array 205, image(s) captured by one of the cameras 630A-630D, image(s) captured by one of the cameras 730A-730D, the sensor data of operation 805, sensor data captured using the input device 945, any other sensor data described herein, any other sensor data described herein, or a combination thereof. The input data in the input layer 410 can also include other data, such as data corresponding to sensor data processing parameters, such as noise level 210, denoising amount 215, and the like. In some examples, the input data in the input layer 410 can be structured as an input tensor with one or more channels or dimensions of data, such as the input tensor 220 (with 3 channels) or the input tensor 305 (with 5 channels).

The images can include image data from an image sensor including raw pixel data (including a single color per pixel based, for example, on a Bayer filter) or processed pixel values (e.g., RGB pixels of an RGB image). The neural network 400 includes multiple hidden layers 412, 412B, through 412N. The hidden layers 412, 412B, through 412N include "N" number of hidden layers, where "N" is an integer greater than or equal to one. The number of hidden layers can be made to include as many layers as needed for the given application. The neural network 400 further includes an output layer 414 that provides an output resulting from the processing performed by the hidden layers 412, 412B, through 412N.

The output layer 414 can provide output data for an operation performed using the NN 400. For instance, the output layer 414 can provide processed sensor data as output data, such as the processed sensor data 230, the processed sensor data 320, the processed sensor data of operation 820, or a combination thereof.

The neural network 400 is a multi-layer neural network of interconnected filters. Each filter can be trained to learn a feature representative of the input data. Information associated with the filters is shared among the different layers and each layer retains information as information is processed. In some cases, the neural network 400 can include a feed-forward network, in which case there are no feedback connections where outputs of the network are fed back into itself. In some cases, the network 400 can include a recurrent neural network, which can have loops that allow information to be carried across nodes while reading in input.

In some cases, information can be exchanged between the layers through node-to-node (neuron-to-neuron) interconnections (synapses) between the various layers. In some cases, the network can include a convolutional neural network, which may not link every node in one layer to every other node in the next layer. In networks where information is exchanged between layers, nodes of the input layer 410 can activate a set of nodes in the first hidden layer 412A. For example, as shown, each of the input nodes of the input layer 410 can be connected to each of the nodes of the first hidden layer 412A. The nodes of a hidden layer can transform the information of each input node by applying activation functions (e.g., filters) to this information. The information derived from the transformation can then be passed to and can activate the nodes of the next hidden layer 412B, which can perform their own designated functions. Example functions include convolutional functions, downscaling, upscaling, data transformation, and/or any other suitable functions. The output of the hidden layer 412B can then activate nodes of the next hidden layer, and so on. The output of the last hidden layer 412N can activate one or more nodes of the output layer 414, which provides a processed output image. In some cases, while nodes (e.g., node 416, node 418) in the neural network 400 are shown as having multiple output lines, a node has a single output and all lines shown as being output from a node represent the same output value.

In some cases, each node or interconnection between nodes can have a weight that is a set of parameters derived from the training of the neural network 400. For example, an interconnection between nodes can represent a piece of information learned about the interconnected nodes. The interconnection can have a tunable numeric weight that can be tuned (e.g., based on a training dataset), allowing the neural network 400 to be adaptive to inputs and able to learn as more and more data is processed. For instance, an example weight 420 is illustrated along the interconnection between node 416 and node 418. Other interconnections between other nodes of the neural network 400 can have different corresponding weights. In some examples, nodes (e.g., node 416, node 418) of the neural network 400 have corresponding biases, or bias offsets, that can also be tuned in the neural network 400, for instance during training and/or using the model adjuster 310. In some examples, interconnections between nodes of the neural network 400, such as the interconnection corresponding to the example weight 420, have corresponding biases, or bias offsets, that can also be tuned in the neural network 400, for instance during training and/or using the model adjuster 310.

The neural network 400 is pre-trained to process the features from the data in the input layer 410 using the different hidden layers 412, 412B, through 412N in order to provide the output through the output layer 414.

As noted above, the neural network 400 may be an example of the trained ML model 225 and/or the adjusted ML model 315. In some examples, the model adjuster 310 may adjust the neural network 400 to generate the adjusted ML model 315. For instance, in some examples, the model adjuster 310 may adjust biases, or bias offsets, of certain nodes (e.g., node 416, node 418) and/or interconnections (e.g., the interconnection between node 416 and node 418) of the neural network 400 based on sensor data processing parameter(s) (e.g., the noise level 210 and/or the denoising amount 215) to "fold in" the contributions of the sensor data processing parameter(s) into the neural network 400 to generate the adjusted ML model 315. In some examples, the model adjuster 310 may remove certain nodes (e.g., node 416, node 418), interconnections (e.g., the interconnection between node 416 and node 418), and/or weights (e.g., example weight 420) from the neural network 400 that are associated with processing channels and/or dimensions of data that will no longer be inputs to the adjusted ML model 315 (e.g., channels related to sensor data processing parameters such as the noise level 210 and/or the denoising amount 215 that are in the input tensor 220 but not in the input tensor 305) to generate the adjusted ML model 315.

Figure 5:
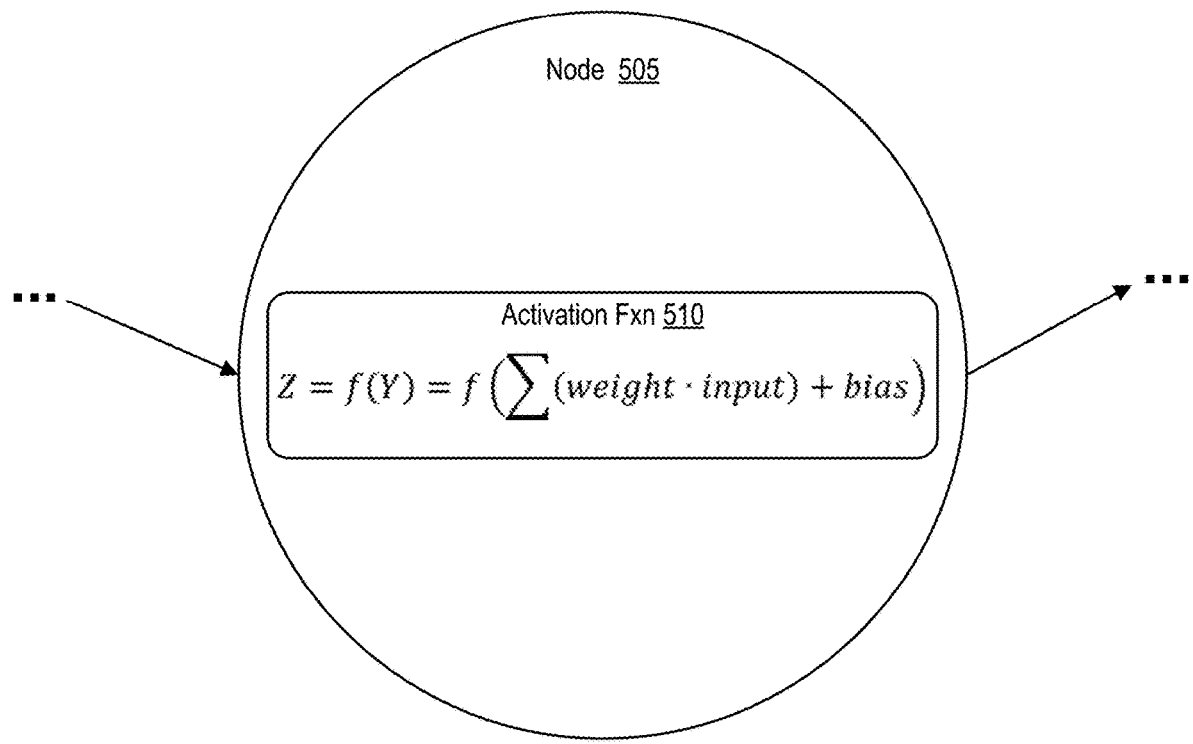
FIG. 5 is a conceptual diagram illustrating an example of a node of a neural network with a corresponding activation function, in accordance with some examples.

FIG. 5 is a conceptual diagram 500 illustrating an example of a node 505 of a neural network with a corresponding activation function. The neural network can be the trained ML model 225, the adjusted ML model 315, the NN 400, another neural network, or a combination thereof. The node 505 can be an example of a node, such as node 416 or node 418. Arrows are illustrated on either side of the node 505, with one arrow feeding into the node 505 from the left and another arrow feeding out of the node 505 to the right. Ellipses on the other ends of the arrows can represent other nodes (e.g., node 416, node 418, node 505), other layers, inputs or outputs of the neural network that the node 505 is a part of, other neural networks (e.g., neural network 400), or combinations thereof. The neural network receives inputs (e.g., via the arrow leading to the node 505 from the left of the node 505) that are passed to the node 505, in some cases with weights and/or biases from earlier nodes in the NN already applied. The interconnections (synapses) between the node 505 and other nodes include weights (e.g., weight 420) that the node 505 can apply to the inputs using an activation function 510 as in Equation 1. In some examples, the weights can be adjusted by the model adjuster 310. The node 505 and/or the connected interconnections (synapses) can be associated with a bias offset, which can be referred to as a bias, and which the node 505 can apply to a sum of the products of the weights and inputs through the activation function 510 as indicated in Equation 1. In some examples, the bias can be adjusted by the model adjuster 310.

$$Z = f(Y) = f\left(\sum (\text{weight} \cdot \text{input}) + \text{bias}\right) \quad \text{Equation 1}$$

In Equation 1, Z represents the output of the node 505, while $f(Y)$ represents the activation function 510. As an example, if the inputs are $x_1, x_2, \ldots x_n$, and the weights are $w_1, w_2, \ldots w_n$, then the node 505 computes the weighted sum of Equation 1 as $x_1 \cdot w_1 + x_2 \cdot w_2 + \ldots + x_n \cdot w_n$ for the activation function 510. The node 505 adds the bias to this weighted sum of Equation 1, producing an output of $x_1 \cdot w_1 + x_2 \cdot w_2 + \ldots + x_n \cdot w_n + \text{bias}$ for the activation function 510. In some examples, the model adjuster 310 can modify the weights (e.g., $w_1, w_2, \ldots w_n$) and/or the biases (e.g., bias) of certain nodes (e.g., node 505) of certain layers of a neural network (e.g., a CNN). An example of the activation function 510 $f(Y)$ is a rectified linear unit (ReLU) activation function, which may be calculated as $f(x) = \max(0, x)$.

Figure 6A:
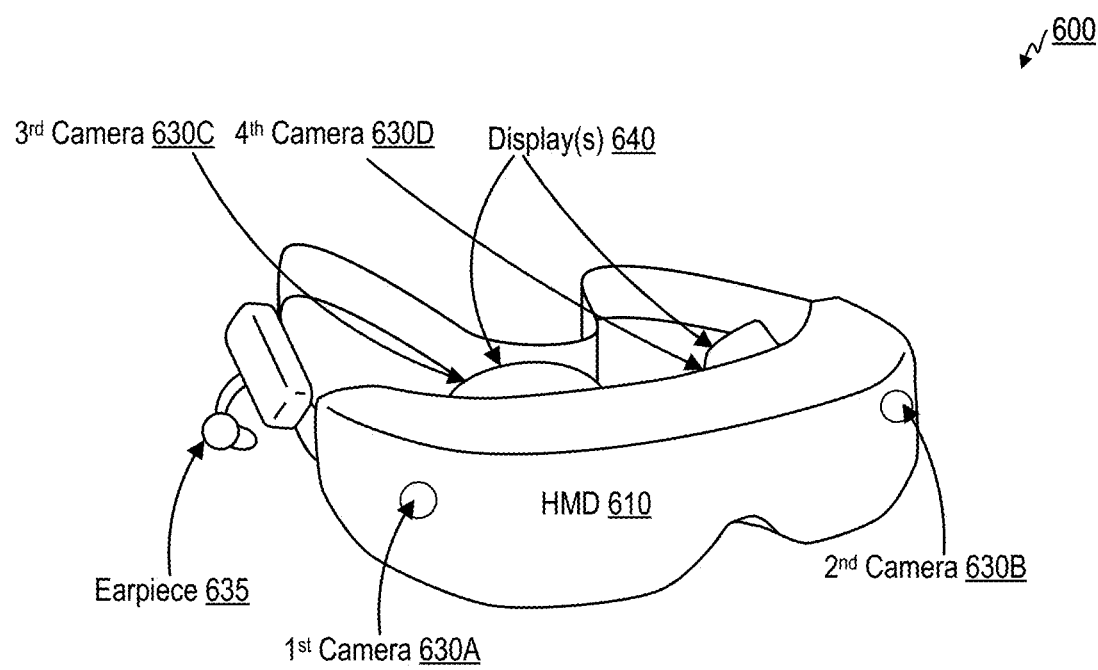
FIG. 6A is a perspective diagram illustrating a head-mounted display (HMD) that is used as part of an imaging system, in accordance with some examples.

FIG. 6A is a perspective diagram 600 illustrating a head-mounted display (HMD) 610 that is used as part of a sensor data processing system 200. The HMD 610 may be, for example, an augmented reality (AR) headset, a virtual reality (VR) headset, a mixed reality (MR) headset, an extended reality (XR) headset, or some combination thereof. The HMD 610 may be an example of a sensor data processing system 200. The HMD 610 includes a first camera 630A and a second camera 630B along a front portion of the HMD 610. The first camera 630A and the second camera 630B may be examples of the sensor of the sensor data processing system 200. The HMD 610 includes a third camera 630C and a fourth camera 630D facing the eye(s) of the user as the eye(s) of the user face the display(s) 640. The third camera 630C and the fourth camera 630D may be examples of the sensor of the sensor data processing system 200. In some examples, the HMD 610 may only have a single camera with a single image sensor. In some examples, the HMD 610 may include one or more additional cameras in addition to the first camera 630A, the second camera 630B, third camera 630C, and the fourth camera 630D. In some examples, the HMD 610 may include one or more additional sensors in addition to the first camera 630A, the second camera 630B, third camera 630C, and the fourth camera 630D, which may also include other types of sensor of the sensor data processing system 200. In some examples, the first camera 630A, the second camera 630B, third camera 630C, and/or the fourth camera 630D may be examples of the image capture and processing system 100, the image capture device 105A, the image processing device 105B, or a combination thereof.

The HMD 610 may include one or more displays 640 that are visible to a user 620 wearing the HMD 610 on the user 620's head. The one or more displays 640 of the HMD 610 can be examples of the one or more displays of the output device(s) 235 of the sensor data processing system 200. In some examples, the HMD 610 may include one display 640 and two viewfinders. The two viewfinders can include a left viewfinder for the user 620's left eye and a right viewfinder for the user 620's right eye. The left viewfinder can be oriented so that the left eye of the user 620 sees a left side of the display. The right viewfinder can be oriented so that the right eye of the user 620 sees a right side of the display. In some examples, the HMD 610 may include two displays 640, including a left display that displays content to the user 620's left eye and a right display that displays content to a user 620's right eye. The one or more displays 640 of the HMD 610 can be digital "pass-through" displays or optical "see-through" displays.

Figure 6B:
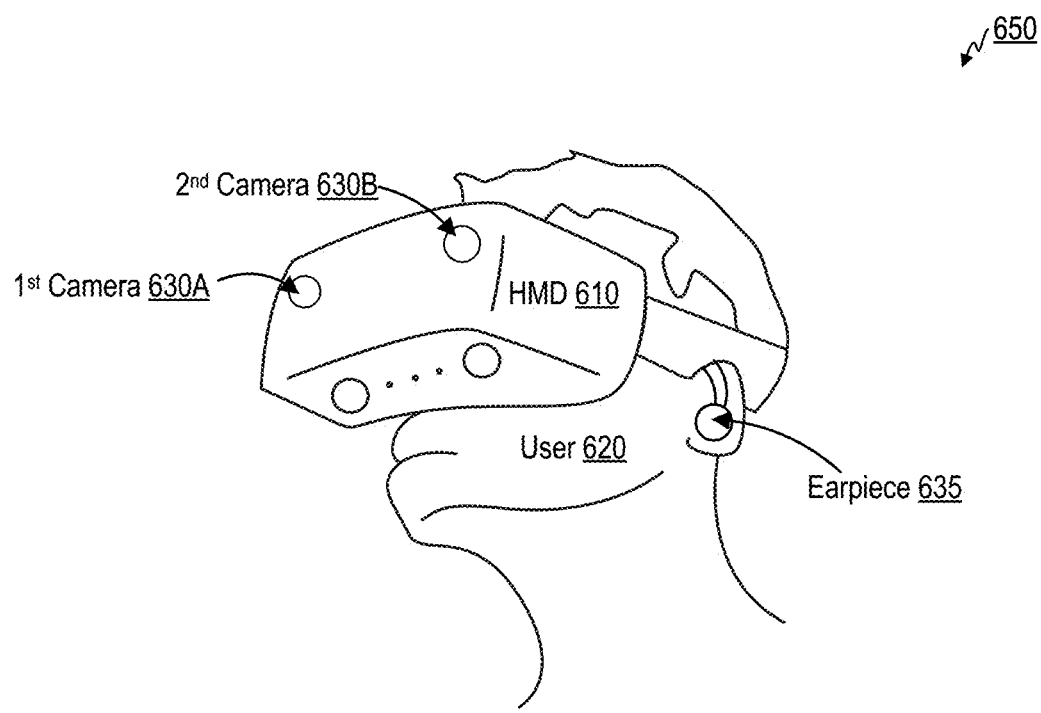
FIG. 6B is a perspective diagram illustrating the head-mounted display (HMD) of FIG. 6A being worn by a user, in accordance with some examples.

The HMD 610 may include one or more earpieces 635, which may function as speakers and/or headphones that output audio to one or more ears of a user of the HMD 610, and may be examples of output device(s) 235. One earpiece 635 is illustrated in FIGS. 6A and 6B, but it should be understood that the HMD 610 can include two earpieces, with one earpiece for each ear (left ear and right ear) of the user. In some examples, the HMD 610 can also include one or more microphones (not pictured). In some examples, the audio output by the HMD 610 to the user through the one or more earpieces 635 may include, or be based on, audio recorded using the one or more microphones.

FIG. 6B is a perspective diagram 650 illustrating the head-mounted display (HMD) of FIG. 6A being worn by a user 620. The user 620 wears the HMD 610 on the user 620's head over the user 620's eyes. The HMD 610 can capture images with the first camera 630A and the second camera 630B. In some examples, the HMD 610 displays one or more output images toward the user 620's eyes using the display(s) 640. In some examples, the output images can include the processed sensor data 230. The output images can be based on the images captured by the first camera 630A and the second camera 630B (e.g., the sensor data array 205), for example with the processed content (e.g., the processed sensor data 230 and/or the processed sensor data 320) overlaid. The output images may provide a stereoscopic view of the environment, in some cases with the processed content overlaid and/or with other modifications. For example, the HMD 610 can display a first display image to the user 620's right eye, the first display image based on an image captured by the first camera 630A. The HMD 610 can display a second display image to the user 620's left eye, the second display image based on an image captured by the second camera 630B. For instance, the HMD 610 may provide overlaid processed content in the display images overlaid over the images captured by the first camera 630A and the second camera 630B. The third camera 630C and the fourth camera 630D can capture images of the eyes of the before, during, and/or after the user views the display images displayed by the display(s) 640. This way, the sensor data from the third camera 630C and/or the fourth camera 630D can capture reactions to the processed content by the user's eyes (and/or other portions of the user). An earpiece 635 of the HMD 610 is illustrated in an ear of the user 620. The HMD 610 may be outputting audio to the user 620 through the earpiece 635 and/or through another earpiece (not pictured) of the HMD 610 that is in the other ear (not pictured) of the user 620.

Figure 7A:
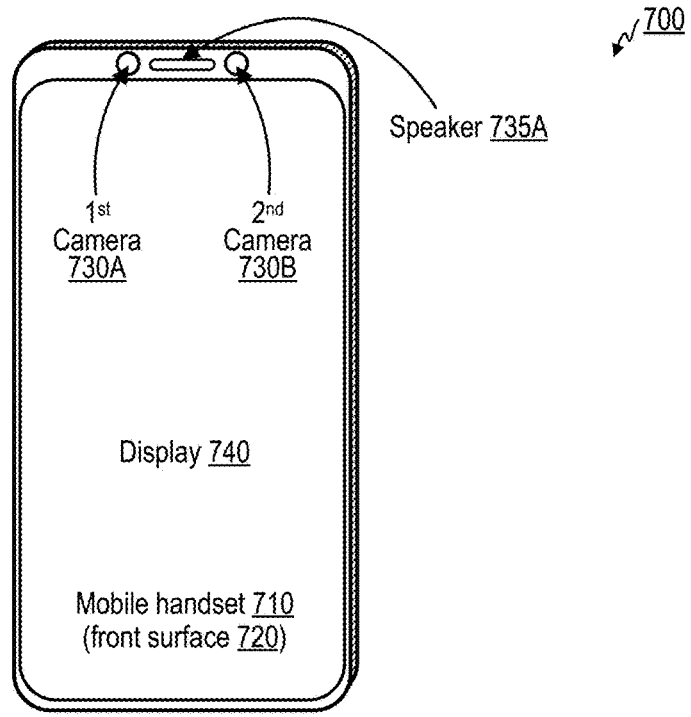
FIG. 7A is a perspective diagram illustrating a front surface of a mobile handset that includes front-facing cameras and that can be used as part of an imaging system, in accordance with some examples.

FIG. 7A is a perspective diagram 700 illustrating a front surface of a mobile handset 710 that includes front-facing cameras and can be used as part of a sensor data processing system 200. The mobile handset 710 may be an example of a sensor data processing system 200. The mobile handset 710 may be, for example, a cellular telephone, a satellite phone, a portable gaming console, a music player, a health tracking device, a wearable device, a wireless communication device, a laptop, a mobile device, any other type of computing device or computing system discussed herein, or a combination thereof.

The front surface 720 of the mobile handset 710 includes a display 740. The front surface 720 of the mobile handset 710 includes a first camera 730A and a second camera 730B. The first camera 730A and the second camera 730B may be examples of the sensor of the sensor data processing system 200. The first camera 730A and the second camera 730B can face the user, including the eye(s) of the user, while content (e.g., the processed sensor data 230 and/or the processed sensor data 320) is displayed on the display 740. The display 740 may be an example of the display(s) of the output device(s) 235 of the sensor data processing system 200.

The first camera 730A and the second camera 730B are illustrated in a bezel around the display 740 on the front surface 720 of the mobile handset 710. In some examples, the first camera 730A and the second camera 730B can be positioned in a notch or cutout that is cut out from the display 740 on the front surface 720 of the mobile handset 710. In some examples, the first camera 730A and the second camera 730B can be under-display cameras that are positioned between the display 740 and the rest of the mobile handset 710, so that light passes through a portion of the display 740 before reaching the first camera 730A and the second camera 730B. The first camera 730A and the second camera 730B of the perspective diagram 700 are front-facing cameras. The first camera 730A and the second camera 730B face a direction perpendicular to a planar surface of the front surface 720 of the mobile handset 710. The first camera 730A and the second camera 730B may be two of the one or more cameras of the mobile handset 710. In some examples, the front surface 720 of the mobile handset 710 may only have a single camera.

In some examples, the display 740 of the mobile handset 710 displays one or more output images toward the user using the mobile handset 710. In some examples, the output images can include the processed sensor data 230. The output images can be based on the images (e.g., the sensor data array 205) captured by the first camera 730A, the second camera 730B, the third camera 730C, and/or the fourth camera 730D, for example with the processed content (e.g., the processed sensor data 230 and/or the processed sensor data 320) overlaid.

In some examples, the front surface 720 of the mobile handset 710 may include one or more additional cameras in addition to the first camera 730A and the second camera 730B. The one or more additional cameras may also be examples of the sensor of the sensor data processing system 200. In some examples, the front surface 720 of the mobile handset 710 may include one or more additional sensors in addition to the first camera 730A and the second camera 730B. The one or more additional sensors may also be examples of the sensor of the sensor data processing system 200. In some cases, the front surface 720 of the mobile handset 710 includes more than one display 740. The one or more displays 740 of the front surface 720 of the mobile handset 710 can be examples of the display(s) of the output device(s) 235 of the sensor data processing system 200. For example, the one or more displays 740 can include one or more touchscreen displays.

The mobile handset 710 may include one or more speakers 735A and/or other audio output devices (e.g., earphones or headphones or connectors thereto), which can output audio to one or more ears of a user of the mobile handset 710. One speaker 735A is illustrated in FIG. 7A, but it should be understood that the mobile handset 710 can include more than one speaker and/or other audio device. In some examples, the mobile handset 710 can also include one or more microphones (not pictured). In some examples, the mobile handset 710 can include one or more microphones along and/or adjacent to the front surface 720 of the mobile handset 710, with these microphones being examples of the sensor of the sensor data processing system 200. In some examples, the audio output by the mobile handset 710 to the user through the one or more speakers 735A and/or other audio output devices may include, or be based on, audio recorded using the one or more microphones.

Figure 7B:
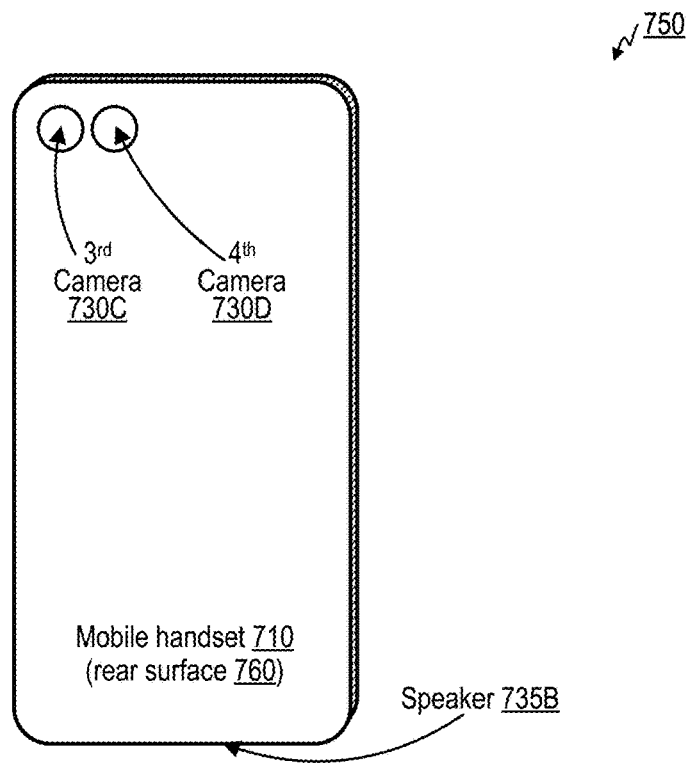
FIG. 7B is a perspective diagram illustrating a rear surface of a mobile handset that includes rear-facing cameras and that can be used as part of an imaging system, in accordance with some examples.

FIG. 7B is a perspective diagram 750 illustrating a rear surface 760 of a mobile handset that includes rear-facing cameras and that can be used as part of a sensor data processing system 200. The mobile handset 710 includes a third camera 730C and a fourth camera 730D on the rear surface 760 of the mobile handset 710. The third camera 730C and the fourth camera 730D of the perspective diagram 750 are rear-facing. The third camera 730C and the fourth camera 730D may be examples of the sensor of the sensor data processing system 200. The third camera 730C and the fourth camera 730D face a direction perpendicular to a planar surface of the rear surface 760 of the mobile handset 710.

The third camera 730C and the fourth camera 730D may be two of the one or more cameras of the mobile handset 710. In some examples, the rear surface 760 of the mobile handset 710 may only have a single camera. In some examples, the rear surface 760 of the mobile handset 710 may include one or more additional cameras in addition to the third camera 730C and the fourth camera 730D. The one or more additional cameras may also be examples of the sensor of the sensor data processing system 200. In some examples, the rear surface 760 of the mobile handset 710 may include one or more additional sensors in addition to the third camera 730C and the fourth camera 730D. The one or more additional sensors may also be examples of the sensor of the sensor data processing system 200. In some examples, the first camera 730A, the second camera 730B, third camera 730C, and/or the fourth camera 730D may be examples of the image capture and processing system 100, the image capture device 105A, the image processing device 105B, or a combination thereof.

The mobile handset 710 may include one or more speakers 735B and/or other audio output devices (e.g., earphones or headphones or connectors thereto), which can output audio to one or more ears of a user of the mobile handset 710. One speaker 735B is illustrated in FIG. 7B, but it should be understood that the mobile handset 710 can include more than one speaker and/or other audio device. In some examples, the mobile handset 710 can also include one or more microphones (not pictured). In some examples, the mobile handset 710 can include one or more microphones along and/or adjacent to the rear surface 760 of the mobile handset 710, with these microphones being examples of the sensor of the sensor data processing system 200. In some examples, the audio output by the mobile handset 710 to the user through the one or more speakers 735B and/or other audio output devices may include, or be based on, audio recorded using the one or more microphones.

The mobile handset 710 may use the display 740 on the front surface 720 as a pass-through display. For instance, the display 740 may display output images, such as the processed sensor data 230. The output images can be based on the images (e.g. the sensor data array 205) captured by the third camera 730C and/or the fourth camera 730D, for example with the processed content (e.g., the processed sensor data 230 and/or the processed sensor data 320) overlaid. The first camera 730A and/or the second camera 730B can capture images of the user's eyes (and/or other portions of the user) before, during, and/or after the display of the output images with the processed content on the display 740. This way, the sensor data from the first camera 730A and/or the second camera 730B can capture reactions to the processed content by the user's eyes (and/or other portions of the user).

Figure 8:
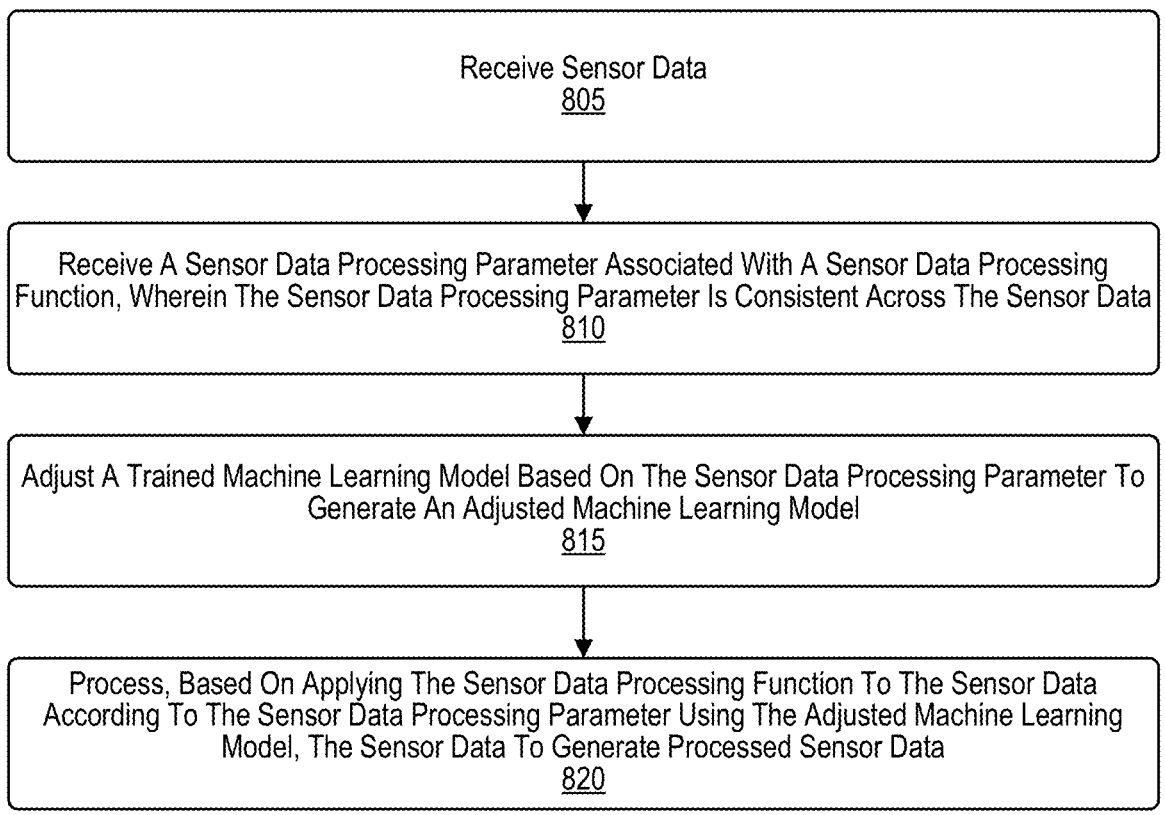
FIG. 8 is a flow diagram illustrating a process for imaging, in accordance with some examples.

FIG. 8 is a flow diagram illustrating a process 800 for imaging. The process 800 may be performed by an imaging system. In some examples, the imaging system can include, for example, the image capture and processing system 100, the image capture device 105A, the image processing device 105B, the image processor 150, the ISP 154, the host processor 152, the sensor data processing system 200, the sensor data processing system 300, the neural network 400, the node 505, the HMD 610, the mobile handset 710, the computing system 900, the processor 910, an apparatus, a system, a non-transitory computer-readable medium coupled to a processor, or a combination thereof.

At operation 805, the sensor data processing system (or at least one subsystem thereof) is configured to, and can, receive sensor data (e.g., sensor data array 205). The sensor data can be referred to as media data. In some examples, the sensor data is captured using a sensor, and/or received from a sensor. In some examples, the sensor data includes image data, and the sensor includes an image sensor. In some examples, the sensor data includes audio data, and the sensor includes an audio sensor (e.g., a microphone). In some examples, the sensor data includes depth data, and the sensor includes a depth sensor (e.g., RADAR, LIDAR, SONAR, SODAR, time of flight, structured light, stereoscopic camera). In some examples, the sensor data may be received, retrieved, downloaded, or otherwise obtained from another source than a sensor. In some examples, the sensor data may be generated.

Examples of the sensor include the image sensor 130, sensor(s) that capture the sensor data array 205, a sensor used to capture sensor data used as input data for the input layer 410 of the NN 400, the first camera 630A, the second camera 630B, the third camera 630C, the fourth camera 630D, the first camera 730A, the second camera 730B, the third camera 730C, the fourth camera 730D, the input device 945, another sensor described herein, or a combination thereof. Examples of the sensor data include the sensor data array 205, an image used as input data for the input layer 410 of the NN 400, an image captured by the any of the examples of the sensor listed above, or a combination thereof.

At operation 810, the sensor data processing system (or at least one subsystem thereof) is configured to, and can, receive a sensor data processing parameter (e.g., noise level 210, denoising amount 215) associated with a sensor data processing function (e.g., a denoising function). The sensor data processing parameter is consistent (e.g., constant and/or static) across the sensor data. For instance, if the sensor data includes image data, the sensor data processing parameter is consistent across pixels of the image data (e.g., the pixels of at least a portion of an image). If the sensor data includes video data, the sensor data processing parameter is consistent across pixels and/or video frames of the video data.

At operation 815, the sensor data processing system (or at least one subsystem thereof) is configured to, and can, adjust (e.g., using the model adjuster 310) a trained machine learning model (e.g., trained ML model 225, neural network 400, and/or a neural network that includes the node 505) based on the sensor data processing parameter to generate an adjusted machine learning model (e.g., adjusted trained ML model 315, neural network 400, and/or a neural network that includes the node 505).

In some aspects, adjusting the trained machine learning model based on the sensor data processing parameter to generate the adjusted machine learning model (as in operation 815) includes adjusting a bias offset for at least one layer of the trained machine learning model based on the sensor data processing parameter. In some aspects, adjusting the trained machine learning model based on the sensor data processing parameter to generate the adjusted machine learning model (as in operation 815) includes removing at least one weight associated with the sensor data processing parameter from the trained machine learning model. In some aspects, adjusting the trained machine learning model based on the sensor data processing parameter to generate the adjusted machine learning model (as in operation 815) includes adjusting the trained machine learning model based on the sensor data processing parameter without retraining the trained machine learning model.

At operation 820, the sensor data processing system (or at least one subsystem thereof) is configured to, and can, process, based on applying the sensor data processing function to the sensor data according to the sensor data processing parameter using the adjusted machine learning model, the sensor data to generate processed sensor data (e.g., processed sensor data 230, processed sensor data 320).

In some aspects, applying the sensor data processing function to the sensor data according to the sensor data processing parameter using the adjusted machine learning model (as in operation 820) includes inputting the sensor data into the adjusted machine learning model without inputting the sensor data processing parameter into the adjusted machine learning model.

In some aspects, the sensor data processing system (or at least one subsystem thereof) is configured to, and can, receive a second sensor data processing parameter that is consistent across the sensor data. The sensor data processing system can adjust the trained machine learning model (as in operation 815) based on the sensor data processing parameter and the second sensor data processing parameter to generate the adjusted machine learning model. The sensor data processing system can process the sensor data using the adjusted machine learning model to apply the sensor data processing function to the sensor data (as in operation 820) according to the sensor data processing parameter and the second sensor data processing parameter and to generate processed sensor data. In some aspects, the second sensor data processing parameter is associated with the sensor data processing function. For instance, if the sensor data processing function is a denoising function, then the noise level 210 and the denoising amount 215 can be examples of the sensor data processing parameter and the second sensor data processing parameter, respectively. In some aspects, the second sensor data processing parameter is associated with a second sensor data processing function. For instance, the sensor data processing parameter can be associated with a denoising function while the second sensor data processing parameter can be associated with a sharpening function.

In some aspects, the sensor data includes image data (e.g., an image captured using the image capture and processing system 100, the red/green/blue color channel data of the sensor data array 205). In some aspects, applying the sensor data processing function to the sensor data according to the sensor data processing parameter using the adjusted machine learning model (as in operation 820) includes inputting an input tensor (e.g., input tensor 220, input tensor 305) into the adjusted machine learning model. The input tensor includes a plurality of input tensor channels (e.g., 5 input tensor channels for input tensor 220, 3 input tensor channels for input tensor 305). The plurality of input tensor channels include information corresponding to a plurality of color channels of the image data (e.g., 3 color channels for red, blue, and green color channels for the sensor data array 205). In some aspects, the plurality of input tensor channels include information corresponding to the plurality of color channels of the image data without including information corresponding to the sensor data processing parameter (e.g., the input tensor 305 includes 3 input tensor channels corresponding to the 3 color channels of the sensor data array 205 without including input tensor channels corresponding to sensor data processing parameters such as noise level 210 or denoising amount 215).

In some aspects, the sensor data processing function is a denoising function, the sensor data processing parameter is associated with at least one of a noise level of the image data (e.g., noise level 210) or a denoising amount for denoising the image data (e.g., 215), and the processed sensor data includes denoised sensor data corresponding to application of the denoising function to the sensor data according to the sensor data processing parameter. In some aspects, the sensor data processing function is a sharpening function, the sensor data processing parameter is associated with at least one of a sharpness level of the image data or a sharpening amount for sharpening the image data, and the processed sensor data includes sharpened sensor data corresponding to application of the sharpening function to the sensor data according to the sensor data processing parameter. In some aspects, the sensor data processing function is a brightness adjustment function, the sensor data processing parameter is associated with at least one of a brightness level of the image data or a brightness adjustment amount for adjusting brightness in the image data, and the processed sensor data includes brightness-adjusted sensor data corresponding to application of the brightness adjustment function to the sensor data according to the sensor data processing parameter. In some aspects, the sensor data processing function is a saturation adjustment function, the sensor data processing parameter is associated with at least one of a saturation level of the image data or a saturation adjustment amount for adjusting saturation in the image data, and the processed sensor data includes saturation-adjusted sensor data corresponding to application of the saturation adjustment function to the sensor data according to the sensor data processing parameter. In some aspects, the sensor data processing function is a tone mapping function, the sensor data processing parameter is associated with at least one of a set of tones of the image data or a tone mapping for adjusting tone in the image data, and the processed sensor data includes tone-adjusted sensor data corresponding to application of the tone mapping function to the sensor data according to the sensor data processing parameter.

In some aspects, the sensor data includes video data, and the processed sensor data includes processed video data. In some aspects, the sensor data includes audio data, and the processed sensor data includes processed audio data. In some aspects, the sensor data includes depth data, and the processed sensor data includes processed depth data.

In some aspects, the trained machine learning model is a neural network (NN) (e.g., neural network 400) and the adjusted machine learning model is an adjusted NN with at least one change to at least one layer of the NN (e.g., input layer 410, any of hidden layers 412A-412N, output layer 414, and/or a layer that includes node 505). In some aspects, the trained machine learning model is a convolutional neural network (CNN), and wherein the adjusted machine learning model is an adjusted CNN with at least one change to at least one layer of the CNN.

In some aspects, the sensor data processing system (or at least one subsystem thereof) is configured to, and can, output the processed sensor data (e.g., using the output device(s) 235, the output device 935, and/or the communication interface 940). In some aspects, the sensor data processing system (or at least one subsystem thereof) is configured to, and can, causing display of the processed sensor data using a display (e.g., that is part of the output device(s) 235 and/or output device 935). In some aspects, the sensor data processing system (or at least one subsystem thereof) is configured to, and can, causing the processed sensor data to be sent to a recipient device using a communication transceiver (e.g., that is part of the output device(s) 235, the output device 935, and/or the communication interface 940).

In some examples, the processes described herein (e.g., the respective processes of FIGS. 1, 2, 3, 4, 5, the process 800 of FIG. 8, and/or other processes described herein) may be performed by a computing device or apparatus. In some examples, the processes described herein can be performed by the image capture and processing system 100, the image capture device 105A, the image processing device 105B, the image processor 150, the ISP 154, the host processor 152, the sensor data processing system 200, the sensor data processing system 300, the neural network 400, the node 505, the HMD 610, the mobile handset 710, the imaging system that performs the process 800, the computing system 900, the processor 910, an apparatus, a system, a non-transitory computer-readable medium coupled to a processor, or a combination thereof.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes described herein are illustrated as logical flow diagrams, block diagrams, or conceptual diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 9:
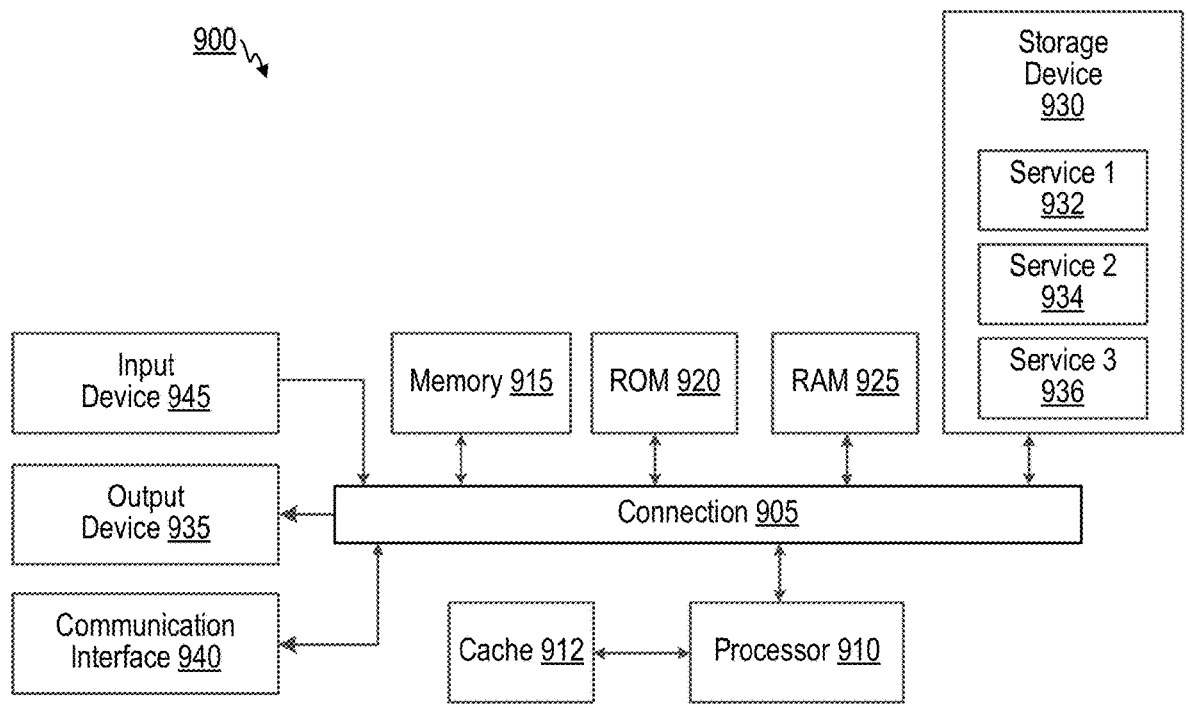
FIG. 9 is a diagram illustrating an example of a computing system for implementing certain aspects described herein.

FIG. 9 is a diagram illustrating an example of a system for implementing certain aspects of the present technology. In particular, FIG. 9 illustrates an example of computing system 900, which can be for example any computing device making up internal computing system, a remote computing system, a camera, or any component thereof in which the components of the system are in communication with each other using connection 905. Connection 905 can be a physical connection using a bus, or a direct connection into processor 910, such as in a chipset architecture. Connection 905 can also be a virtual connection, networked connection, or logical connection.

In some aspects, computing system 900 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 900 includes at least one processing unit (CPU or processor) 910 and connection 905 that couples various system components including system memory 915, such as read-only memory (ROM) 920 and random access memory (RAM) 925 to processor 910. Computing system 900 can include a cache 912 of high-speed memory connected directly with, in close proximity to, or integrated as part of processor 910.

Processor 910 can include any general purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms. In some instances, multimodal systems can enable a user to provide multiple types of input/output to communicate with computing system 900. Computing system 900 can include communications interface 940, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 902.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 940 may also include one or more Global Navigation Satellite System (GNSS) receivers or transceivers that are used to determine a location of the computing system 900 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 930 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 930 can include software services, servers, services, etc., that when the code that defines such software is executed by the processor 910, it causes the system to perform a function. In some aspects, a hardware service that performs a particular function can include the software component stored in a computer-readable medium in connection with the necessary hardware components, such as processor 910, connection 905, output device 935, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per sc.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1. An apparatus for sensor data processing, the apparatus comprising: at least one memory; and at least one processor coupled to the at least one memory and configured to: receive sensor data; receive a sensor data processing parameter associated with a sensor data processing function, wherein the sensor data processing parameter is consistent across the sensor data; adjust a trained machine learning model based on the sensor data processing parameter to generate an adjusted machine learning model; and process, based on applying the sensor data processing function to the sensor data according to the sensor data processing parameter using the adjusted machine learning model, the sensor data to generate processed sensor data.

Aspect 2. The apparatus of Aspect 1, the at least one processor configured to: input the sensor data into the adjusted machine learning model without inputting the sensor data processing parameter into the adjusted machine learning model to apply the sensor data processing function to the sensor data according to the sensor data processing parameter using the adjusted machine learning model.

Aspect 3. The apparatus of any of Aspects 1 to 2, the at least one processor configured to: adjust a bias offset for at least one layer of the trained machine learning model based on the sensor data processing parameter to adjust the trained machine learning model based on the sensor data processing parameter and to generate the adjusted machine learning model.

Aspect 4. The apparatus of any of Aspects 1 to 3, the at least one processor configured to: remove at least one weight associated with the sensor data processing parameter from the trained machine learning model to adjust the trained machine learning model based on the sensor data processing parameter to generate the adjusted machine learning model.

Aspect 5. The apparatus of any of Aspects 1 to 4, the at least one processor configured to: adjust the trained machine learning model based on the sensor data processing parameter without retraining the trained machine learning model to adjust the trained machine learning model based on the sensor data processing parameter to generate the adjusted machine learning model.

Aspect 6. The apparatus of any of Aspects 1 to 5, the at least one processor configured to: receive a second sensor data processing parameter that is consistent across the sensor data; adjust the trained machine learning model based on the sensor data processing parameter and the second sensor data processing parameter to generate the adjusted machine learning model; and process the sensor data using the adjusted machine learning model to apply the sensor data processing function to the sensor data according to the sensor data processing parameter and the second sensor data processing parameter and to generate processed sensor data.

Aspect 7. The apparatus of Aspect 6, wherein the second sensor data processing parameter is associated with the sensor data processing function.

Aspect 8. The apparatus of any of Aspects 6 to 7, wherein the second sensor data processing parameter is associated with a second sensor data processing function.

Aspect 9. The apparatus of any of Aspects 1 to 8, wherein the sensor data includes image data.

Aspect 10. The apparatus of Aspect 9, the at least one processor configured to: input an input tensor into the adjusted machine learning model to apply the sensor data processing function to the sensor data according to the sensor data processing parameter using the adjusted machine learning model, wherein the input tensor includes a plurality of input tensor channels, wherein the plurality of input tensor channels include information corresponding to a plurality of color channels of the image data.

Aspect 11. The apparatus of Aspect 10, wherein the plurality of input tensor channels include information corresponding to the plurality of color channels of the image data without including information corresponding to the sensor data processing parameter.

Aspect 12. The apparatus of any of Aspects 9 to 11, wherein the sensor data processing function is a denoising function, wherein the sensor data processing parameter is associated with at least one of a noise level of the image data or a denoising amount for denoising the image data, and wherein the processed sensor data includes denoised sensor data corresponding to application of the denoising function to the sensor data according to the sensor data processing parameter.

Aspect 13. The apparatus of any of Aspects 9 to 12, wherein the sensor data processing function is a sharpening function, wherein the sensor data processing parameter is associated with at least one of a sharpness level of the image data or a sharpening amount for sharpening the image data, and wherein the processed sensor data includes sharpened sensor data corresponding to application of the sharpening function to the sensor data according to the sensor data processing parameter.

Aspect 14. The apparatus of any of Aspects 9 to 13, wherein the sensor data processing function is a brightness adjustment function, wherein the sensor data processing parameter is associated with at least one of a brightness level of the image data or a brightness adjustment amount for adjusting brightness in the image data, and wherein the processed sensor data includes brightness-adjusted sensor data corresponding to application of the brightness adjustment function to the sensor data according to the sensor data processing parameter.

Aspect 15. The apparatus of any of Aspects 9 to 14, wherein the sensor data processing function is a saturation adjustment function, wherein the sensor data processing parameter is associated with at least one of a saturation level of the image data or a saturation adjustment amount for adjusting saturation in the image data, and wherein the processed sensor data includes saturation-adjusted sensor data corresponding to application of the saturation adjustment function to the sensor data according to the sensor data processing parameter.

Aspect 16. The apparatus of any of Aspects 9 to 15, wherein the sensor data processing function is a tone mapping function, wherein the sensor data processing parameter is associated with at least one of a set of tones of the image data or a tone mapping for adjusting tone in the image data, and wherein the processed sensor data includes tone-adjusted sensor data corresponding to application of the tone mapping function to the sensor data according to the sensor data processing parameter.

Aspect 17. The apparatus of any of Aspects 1 to 16, wherein the sensor data includes video data, and wherein the processed sensor data includes processed video data.

Aspect 18. The apparatus of any of Aspects 1 to 17, wherein the sensor data includes audio data, and wherein the processed sensor data includes processed audio data.

Aspect 19. The apparatus of any of Aspects 1 to 18, wherein the sensor data includes depth data, and wherein the processed sensor data includes processed depth data.

Aspect 20. The apparatus of any of Aspects 1 to 19, wherein the trained machine learning model is a convolutional neural network (CNN), and wherein the adjusted machine learning model is an adjusted CNN with at least one change to at least one layer of the CNN.

Aspect 21. The apparatus of any of Aspects 1 to 20, the at least one processor configured to: output the processed sensor data.

Aspect 22. The apparatus of any of Aspects 1 to 21, the at least one processor configured to: cause display of the processed sensor data using a display.

Aspect 23. The apparatus of any of Aspects 1 to 22, the at least one processor configured to: cause the processed sensor data to be sent to a recipient device using a communication transceiver.

Aspect 24. The apparatus of any of Aspects 1 to 23, wherein the apparatus includes at least one of a head-mounted display (HMD), a mobile handset, or a wireless communication device.

Aspect 25. A method for sensor data processing, the method comprising: receiving sensor data; receiving a sensor data processing parameter associated with a sensor data processing function, wherein the sensor data processing parameter is consistent across the sensor data; adjusting a trained machine learning model based on the sensor data processing parameter to generate an adjusted machine learning model; and processing, based on applying the sensor data processing function to the sensor data according to the sensor data processing parameter using the adjusted machine learning model, the sensor data to generate processed sensor data.

Aspect 26. The method of Aspect 25, wherein applying the sensor data processing function to the sensor data according to the sensor data processing parameter using the adjusted machine learning model includes inputting the sensor data into the adjusted machine learning model without inputting the sensor data processing parameter into the adjusted machine learning model.

Aspect 27. The method of any of Aspects 25 to 26, wherein adjusting the trained machine learning model based on the sensor data processing parameter to generate the adjusted machine learning model includes adjusting a bias offset for at least one layer of the trained machine learning model based on the sensor data processing parameter.

Aspect 28. The method of any of Aspects 25 to 27, wherein adjusting the trained machine learning model based on the sensor data processing parameter to generate the adjusted machine learning model includes removing at least one weight associated with the sensor data processing parameter from the trained machine learning model.

Aspect 29. The method of any of Aspects 25 to 28, wherein adjusting the trained machine learning model based on the sensor data processing parameter to generate the adjusted machine learning model includes adjusting the trained machine learning model based on the sensor data processing parameter without retraining the trained machine learning model.

Aspect 30. The method of any of Aspects 25 to 29, further comprising: receiving a second sensor data processing parameter that is consistent across the sensor data; adjusting the trained machine learning model based on the sensor data processing parameter and the second sensor data processing parameter to generate the adjusted machine learning model; and processing the sensor data using the adjusted machine learning model to apply the sensor data processing function to the sensor data according to the sensor data processing parameter and the second sensor data processing parameter and to generate processed sensor data.

Aspect 31. The method of Aspect 30, wherein the second sensor data processing parameter is associated with the sensor data processing function.

Aspect 32. The method of any of Aspects 30 to 31, wherein the second sensor data processing parameter is associated with a second sensor data processing function.

Aspect 33. The method of any of Aspects 25 to 32, wherein the sensor data includes image data.

Aspect 34. The method of Aspect 33, wherein applying the sensor data processing function to the sensor data according to the sensor data processing parameter using the adjusted machine learning model includes inputting an input tensor into the adjusted machine learning model, wherein the input tensor includes a plurality of input tensor channels, wherein the plurality of input tensor channels include information corresponding to a plurality of color channels of the image data.

Aspect 35. The method of Aspect 34, wherein the plurality of input tensor channels include information corresponding to the plurality of color channels of the image data without including information corresponding to the sensor data processing parameter.

Aspect 36. The method of any of Aspects 33 to 35, wherein the sensor data processing function is a denoising function, wherein the sensor data processing parameter is associated with at least one of a noise level of the image data or a denoising amount for denoising the image data, and wherein the processed sensor data includes denoised sensor data corresponding to application of the denoising function to the sensor data according to the sensor data processing parameter.

Aspect 37. The method of any of Aspects 33 to 36, wherein the sensor data processing function is a sharpening function, wherein the sensor data processing parameter is associated with at least one of a sharpness level of the image data or a sharpening amount for sharpening the image data, and wherein the processed sensor data includes sharpened sensor data corresponding to application of the sharpening function to the sensor data according to the sensor data processing parameter.

Aspect 38. The method of any of Aspects 33 to 37, wherein the sensor data processing function is a brightness adjustment function, wherein the sensor data processing parameter is associated with at least one of a brightness level of the image data or a brightness adjustment amount for adjusting brightness in the image data, and wherein the processed sensor data includes brightness-adjusted sensor data corresponding to application of the brightness adjustment function to the sensor data according to the sensor data processing parameter.

Aspect 39. The method of any of Aspects 33 to 38, wherein the sensor data processing function is a saturation adjustment function, wherein the sensor data processing parameter is associated with at least one of a saturation level of the image data or a saturation adjustment amount for adjusting saturation in the image data, and wherein the processed sensor data includes saturation-adjusted sensor data corresponding to application of the saturation adjustment function to the sensor data according to the sensor data processing parameter.

Aspect 40. The method of any of Aspects 33 to 39, wherein the sensor data processing function is a tone mapping function, wherein the sensor data processing parameter is associated with at least one of a set of tones of the image data or a tone mapping for adjusting tone in the image data, and wherein the processed sensor data includes tone-adjusted sensor data corresponding to application of the tone mapping function to the sensor data according to the sensor data processing parameter.

Aspect 41. The method of any of Aspects 25 to 40, wherein the sensor data includes video data, and wherein the processed sensor data includes processed video data.

Aspect 42. The method of any of Aspects 25 to 41, wherein the sensor data includes audio data, and wherein the processed sensor data includes processed audio data.

Aspect 43. The method of any of Aspects 25 to 42, wherein the sensor data includes depth data, and wherein the processed sensor data includes processed depth data.

Aspect 44. The method of any of Aspects 25 to 43, wherein the trained machine learning model is a convolutional neural network (CNN), and wherein the adjusted machine learning model is an adjusted CNN with at least one change to at least one layer of the CNN.

Aspect 45. The method of any of Aspects 25 to 44, further comprising: outputting the processed sensor data.

Aspect 46. The method of any of Aspects 25 to 45, further comprising: causing display of the processed sensor data using a display.

Aspect 47. The method of any of Aspects 25 to 46, further comprising: causing the processed sensor data to be sent to a recipient device using a communication transceiver.

Aspect 48. A non-transitory computer-readable medium having stored thereon instructions that, when executed by one or more processors, cause the one or more processors to perform operations according to any of Aspects 1 to 47.

Aspect 49. An apparatus for sensor data processing, the apparatus comprising one or more means for performing operations according to any of Aspects 1 to 47.

What is claimed is:

1. An apparatus for sensor data processing, the apparatus comprising:
   at least one memory; and
   at least one processor coupled to the at least one memory, the at least one processor configured to:
   receive sensor data;
   receive a sensor data processing parameter associated with a sensor data processing function, wherein the sensor data processing parameter is consistent across the sensor data;
   adjust a trained machine learning model based on the sensor data processing parameter without retraining the trained machine learning model to generate an adjusted machine learning model; and
   process, based on applying the sensor data processing function to the sensor data according to the sensor data processing parameter using the adjusted machine learning model, the sensor data to generate processed sensor data.

2. The apparatus of claim 1, the at least one processor configured to:
   input the sensor data into the adjusted machine learning model without inputting the sensor data processing parameter into the adjusted machine learning model to apply the sensor data processing function to the sensor data according to the sensor data processing parameter using the adjusted machine learning model.

3. The apparatus of claim 1, the at least one processor configured to:
   adjust a bias offset for at least one layer of the trained machine learning model based on the sensor data processing parameter to adjust the trained machine learning model based on the sensor data processing parameter and to generate the adjusted machine learning model.

4. The apparatus of claim 1, the at least one processor configured to:
   remove at least one weight associated with the sensor data processing parameter from the trained machine learning model to adjust the trained machine learning model based on the sensor data processing parameter to generate the adjusted machine learning model.

5. The apparatus of claim 1, the at least one processor configured to:
   receive a second sensor data processing parameter that is consistent across the sensor data;
   adjust the trained machine learning model based on the sensor data processing parameter and the second sensor data processing parameter to generate the adjusted machine learning model; and
   process the sensor data using the adjusted machine learning model to apply the sensor data processing function to the sensor data according to the sensor data processing parameter and the second sensor data processing parameter and to generate processed sensor data.

6. The apparatus of claim 5, wherein the second sensor data processing parameter is associated with the sensor data processing function.

7. The apparatus of claim 5, wherein the second sensor data processing parameter is associated with a second sensor data processing function.

8. The apparatus of claim 1, wherein the sensor data includes image data.

9. The apparatus of claim 8, the at least one processor configured to:
   input an input tensor into the adjusted machine learning model to apply the sensor data processing function to the sensor data according to the sensor data processing parameter using the adjusted machine learning model, wherein the input tensor includes a plurality of input tensor channels, wherein the plurality of input tensor channels include information corresponding to a plurality of color channels of the image data.

10. The apparatus of claim 9, wherein the plurality of input tensor channels include information corresponding to the plurality of color channels of the image data without including information corresponding to the sensor data processing parameter.

11. The apparatus of claim 8, wherein the sensor data processing function is a denoising function, wherein the sensor data processing parameter is associated with at least one of a noise level of the image data or a denoising amount for denoising the image data, and wherein the processed sensor data includes denoised sensor data corresponding to application of the denoising function to the sensor data according to the sensor data processing parameter.

12. The apparatus of claim 8, wherein the sensor data processing function is a sharpening function, wherein the sensor data processing parameter is associated with at least one of a sharpness level of the image data or a sharpening amount for sharpening the image data, and wherein the processed sensor data includes sharpened sensor data corresponding to application of the sharpening function to the sensor data according to the sensor data processing parameter.

13. The apparatus of claim 8, wherein the sensor data processing function is a brightness adjustment function, wherein the sensor data processing parameter is associated with at least one of a brightness level of the image data or a brightness adjustment amount for adjusting brightness in the image data, and wherein the processed sensor data includes brightness-adjusted sensor data corresponding to application of the brightness adjustment function to the sensor data according to the sensor data processing parameter.

14. The apparatus of claim 8, wherein the sensor data processing function is a saturation adjustment function, wherein the sensor data processing parameter is associated with at least one of a saturation level of the image data or a saturation adjustment amount for adjusting saturation in the image data, and wherein the processed sensor data includes saturation-adjusted sensor data corresponding to application of the saturation adjustment function to the sensor data according to the sensor data processing parameter.

15. The apparatus of claim 8, wherein the sensor data processing function is a tone mapping function, wherein the sensor data processing parameter is associated with at least one of a set of tones of the image data or a tone mapping for adjusting tone in the image data, and wherein the processed sensor data includes tone-adjusted sensor data corresponding to application of the tone mapping function to the sensor data according to the sensor data processing parameter.

16. The apparatus of claim 1, wherein the sensor data includes video data, and wherein the processed sensor data includes processed video data.

17. The apparatus of claim 1, wherein the sensor data includes audio data, and wherein the processed sensor data includes processed audio data.

18. The apparatus of claim 1, wherein the sensor data includes depth data, and wherein the processed sensor data includes processed depth data.

19. The apparatus of claim 1, wherein the trained machine learning model is a convolutional neural network (CNN), and wherein the adjusted machine learning model is an adjusted CNN with at least one change to at least one layer of the CNN.

20. The apparatus of claim 1, the at least one processor configured to:
output the processed sensor data.

21. The apparatus of claim 1, the at least one processor configured to:
cause display of the processed sensor data using a display.

22. The apparatus of claim 1, the at least one processor configured to:
cause the processed sensor data to be sent to a recipient device using a communication transceiver.

23. The apparatus of claim 1, wherein the apparatus includes at least one of a head-mounted display (HMD), a mobile handset, or a wireless communication device.

24. A method for sensor data processing, the method comprising:
receiving sensor data;
receiving a sensor data processing parameter associated with a sensor data processing function, wherein the sensor data processing parameter is consistent across the sensor data;
adjusting a trained machine learning model based on the sensor data processing parameter without retraining the trained machine learning model to generate an adjusted machine learning model; and
processing, based on applying the sensor data processing function to the sensor data according to the sensor data processing parameter using the adjusted machine learning model, the sensor data to generate processed sensor data.

25. The method of claim 24, wherein applying the sensor data processing function to the sensor data according to the sensor data processing parameter using the adjusted machine learning model includes inputting the sensor data into the adjusted machine learning model without inputting the sensor data processing parameter into the adjusted machine learning model.

26. The method of claim 24, wherein adjusting the trained machine learning model based on the sensor data processing parameter to generate the adjusted machine learning model includes adjusting a bias offset for at least one layer of the trained machine learning model based on the sensor data processing parameter.

27. The method of claim 24, wherein adjusting the trained machine learning model based on the sensor data processing parameter to generate the adjusted machine learning model includes removing at least one weight associated with the sensor data processing parameter from the trained machine learning model.

28. The method of claim 25, further comprising:
receiving a second sensor data processing parameter that is consistent across the sensor data;
adjusting the trained machine learning model based on the sensor data processing parameter and the second sensor data processing parameter to generate the adjusted machine learning model; and
processing the sensor data using the adjusted machine learning model to apply the sensor data processing function to the sensor data according to the sensor data processing parameter and the second sensor data processing parameter and to generate processed sensor data.

* * * * *